US007456726B2

(12) United States Patent
Hansen et al.

(10) Patent No.: US 7,456,726 B2
(45) Date of Patent: *Nov. 25, 2008

(54) METHOD AND APPARATUS FOR IMPROVING THE EFFICIENCY AND ACCURACY OF RFID SYSTEMS

(75) Inventors: Thorkild Hansen, Brighton, MA (US); Michael L. Oristaglio, Newtown, CT (US)

(73) Assignee: Seknion, Inc., Brighton, MA (US)

( * ) Notice: Subject to any disclaimer, the term of this patent is extended or adjusted under 35 U.S.C. 154(b) by 357 days.

This patent is subject to a terminal disclaimer.

(21) Appl. No.: 11/066,048

(22) Filed: Feb. 25, 2005

(65) Prior Publication Data

US 2005/0212660 A1 Sep. 29, 2005

Related U.S. Application Data

(60) Provisional application No. 60/550,355, filed on Mar. 5, 2004, provisional application No. 60/550,411, filed on Mar. 5, 2004, provisional application No. 60/561, 433, filed on Apr. 12, 2004, provisional application No. 60/603,531, filed on Aug. 20, 2004, provisional application No. 60/613,428, filed on Sep. 27, 2004.

(51) Int. Cl.
*H04Q 5/22* (2006.01)

(52) U.S. Cl. .................. 340/10.2; 340/10.3; 340/10.34; 340/572.1

(58) Field of Classification Search ................ 340/10.2, 340/825.69, 10.1, 10.3, 10.34, 572.1
See application file for complete search history.

(56) References Cited

U.S. PATENT DOCUMENTS

| 2,530,140 | A | * | 11/1950 | Atkins | .................. 380/252 |
| 4,068,178 | A | * | 1/1978 | Tunzi | .................. 327/107 |
| 4,114,151 | A | * | 9/1978 | Denne et al. | .................. 342/44 |
| 4,467,140 | A | | 8/1984 | Fathauer et al. | |
| 4,956,864 | A | | 9/1990 | Brockman | |
| 4,975,926 | A | | 12/1990 | Knapp | |
| 5,173,705 | A | | 12/1992 | Camiade et al. | |
| 5,252,965 | A | | 10/1993 | Gidwani et al. | |
| 5,265,265 | A | | 11/1993 | Hama et al. | |
| 5,420,589 | A | | 5/1995 | Wells et al. | |
| 5,495,237 | A | | 2/1996 | Yuasa et al. | |
| 5,550,871 | A | | 8/1996 | Lee | |
| 5,564,020 | A | | 10/1996 | Rossi | |
| 5,655,019 | A | | 8/1997 | McKernan et al. | |

(Continued)

FOREIGN PATENT DOCUMENTS

CA 2307156 11/2000

(Continued)

OTHER PUBLICATIONS (Anonymous), "BellSouth Signs Wholesale Agreement With Qwest," PR Newswire, pp. 1, Feb. 6, 2002. (abstract).

(Continued)

*Primary Examiner*—Edwin C Holloway, III
(74) *Attorney, Agent, or Firm*—Fulbright & Jaworski L.L.P.

(57) ABSTRACT

A method and apparatus for transmitting a narrow signal beam are disclosed that allow the precise location of RFID tags to be determined and reduce tag collisions. Also disclosed are a method and apparatus for improving the efficiency of RFID systems.

18 Claims, 39 Drawing Sheets

U.S. PATENT DOCUMENTS

| | | | |
|---|---|---|---|
| 5,663,981 A * | 9/1997 | Takahashi | 375/142 |
| 5,671,219 A | 9/1997 | Jensen et al. | |
| 5,727,608 A | 3/1998 | Nusbaumer et al. | |
| 5,734,487 A | 3/1998 | Rossi | |
| 5,748,147 A | 5/1998 | Bickley et al. | |
| 5,768,264 A | 6/1998 | Anderson et al. | |
| 5,790,022 A | 8/1998 | Delvecchio et al. | |
| 5,805,055 A | 9/1998 | Colizza | |
| 5,805,643 A | 9/1998 | Seki et al. | |
| 5,838,237 A | 11/1998 | Revell et al. | |
| 5,918,155 A | 6/1999 | Nakamura et al. | |
| 5,959,367 A | 9/1999 | O'Farrell et al. | |
| 5,969,673 A | 10/1999 | Bickley et al. | |
| 5,982,322 A | 11/1999 | Bickley et al. | |
| 6,025,780 A | 2/2000 | Bowers et al. | |
| 6,028,551 A | 2/2000 | Schoen et al. | |
| 6,031,497 A | 2/2000 | Nam | |
| 6,035,039 A | 3/2000 | Tisdale et al. | |
| 6,111,550 A | 8/2000 | Miller et al. | |
| 6,175,164 B1 | 1/2001 | O'Farrell et al. | |
| 6,184,841 B1 * | 2/2001 | Shober et al. | 343/853 |
| 6,275,679 B1 | 8/2001 | Elam et al. | |
| 6,285,318 B1 | 9/2001 | Schoen et al. | |
| 6,294,992 B1 | 9/2001 | Addy et al. | |
| 6,397,063 B1 | 5/2002 | Sessions et al. | |
| 6,414,605 B1 | 7/2002 | Walden et al. | |
| 6,545,606 B2 | 4/2003 | Piri et al. | |
| 6,608,588 B2 | 8/2003 | Elam | |
| 6,628,205 B2 | 9/2003 | Aguren et al. | |
| 6,650,846 B1 * | 11/2003 | Ito | 398/184 |
| 6,831,547 B2 * | 12/2004 | Watarai et al. | 340/5.61 |
| 6,970,089 B2 * | 11/2005 | Carrender | 340/572.4 |
| 7,054,296 B1 | 5/2006 | Sorrells et al. | |
| 7,075,436 B2 * | 7/2006 | Shanks et al. | 340/572.1 |
| 7,084,769 B2 * | 8/2006 | Bauer et al. | 340/572.7 |
| 7,106,174 B1 * | 9/2006 | Powell | 340/10.2 |
| 7,119,658 B2 * | 10/2006 | Stilp | 340/5.61 |
| 7,119,692 B2 * | 10/2006 | Lieffort et al. | 340/572.4 |
| 7,248,621 B2 * | 7/2007 | Rudolf | 375/145 |
| 2001/0028302 A1 | 10/2001 | Degrauwe et al. | |
| 2002/0097157 A1 | 7/2002 | Piri et al. | |
| 2003/0026196 A1 | 2/2003 | Chan et al. | |
| 2003/0097304 A1 | 5/2003 | Hunt | |
| 2003/0179073 A1 | 9/2003 | Ghazarian | |
| 2005/0128985 A1 | 6/2005 | Liberti et al. | |
| 2005/0232057 A1 * | 10/2005 | Hansen et al. | 365/230.01 |

FOREIGN PATENT DOCUMENTS

| | | |
|---|---|---|
| EP | 0675459 | 10/1995 |
| EP | 1035502 | 9/2000 |
| EP | 1051049 | 11/2000 |
| EP | 0704717 | 10/2001 |
| EP | 1040460 | 11/2001 |
| EP | 0829167 | 3/2002 |
| EP | 1210693 | 10/2003 |
| JP | 05040893 | 2/1993 |
| JP | 05304514 | 11/1993 |
| JP | 11298238 | 10/1999 |
| JP | 00285208 | 10/2000 |
| JP | 01024547 | 1/2001 |
| JP | 01111501 | 4/2001 |
| JP | 01298377 | 10/2001 |
| JP | 02236953 | 8/2002 |
| JP | 02321725 | 11/2002 |

OTHER PUBLICATIONS (Anonymous), "Beta Awards winners: Best Debut Award—Clearwire Technologies, Inc.," Business First, vol. 17, No. 27, pp. B5, Apr. 2, 2001. (abstract).

(Anonymous), "Certicom and Fujitsu Siemens Computers sign Agreement to Strenghten Security of Fujitsu Siemens Computers Mobile Offering," PR Newswire, pp. 1, Sep. 15, 2003. (abstract).

(Anonymous), "Identix/ANADAC Appoints Former Navy Senior Executive As ANADAC Vice President of Strategic Programs," PR Newswire, pp. 1, Jan. 22, 2001. (abstract).

(Anonymous), "Identix and Datastrip Enter Into OEM Agreement to Combine Fingerprint Biometric Authentication With 2D Bar Code Technology," PR Newswire, pp. 1, Nov. 13, 2001. (abstract).

(Anonymous), "L-3 Communications Acquires Wescam Inc., a Leading Provider of Wireless Visual Information Systems; Adds Electro-optical to L-3's ISR&C Products and Subsystems," Business Wire, pp. 1, Sep. 18, 2002. (abstract).

(Anonymous), "L-3 Communications Announces Strong Third Quarter 2001 Results; Sales, Operating Income and Earnings Per Share Increase 20.2%, 19.7% and 18.8%, Respectively," Business Wire, pp. 1, Oct. 18, 2001. (abstract).

(Anonymous), "Protegrity Announces CEO and Board Appointments; Nevins, Albert and Rodgers Bring Decades of Know-How to Data Security Leader," Business Wire, pp. 1, Jul. 23, 2002. (abstract).

(Anonymous), "Qwest Communications and Perot Systems Sign $20 Million Strategic Agreement; Companies to Jointly Provide Hosting, Network and Management Services," PR Newswire, pp. 1, Sep. 27, 2001. (abstract).

(No author), "724 Solutions and Certicom Team to Deliver First Open and Standards-based, Wireless PKI Solution for the Financial Services Industry. (public key infrastructure) (Brief Article)," Wireless Internet, vol. 2, No. 9, pp. 6, Sep. 1, 2000. (abstract).

(No author), Aether Debuts Wireless Handheld Police Application. (PocketBlue, a wireless handheld application from Aether Systems)(Product Announcement) Telephone IP News, vol. 12, No. 8, Aug. 1, 2001.

(No author), "Automated Trading Desk Selects BellSouth Infrastructure to Power eWall Street," Newswire, pp. 5412, Sep. 30, 2003. (abstract).

(No author), "Business Travellers to Benefit from EFI's Wireless Print Solution; Monzoon to Install PrintMe Networks in 100 Key Wireless Broadband Internet Access Hotspots Across Europe," Newswire, pp. 5255, Mar. 10, 2003. (abstract).

(No author), "Chameleon Debuts Configurable Processor," InsideChips. Ventures, vol. 22, No. 6, p. 23, Jun. 1, 2000.

(No author), "COMSAT Peru Inaugurates Lima Service With Advanced Wireless Telecommunications Network," PR Newswire, pp. 8008, May 26, 1999.

(No author), "Defense Contracts," Defense Daily, vol. 203, No. 47, Sep. 7, 1999.

(No author), "DEMOmobile 2003 Opens to Enthusiastic Executive Audience; Thirty-Seven New Technologies Introduced, All Designed to Improve 'Always On' Life and Work Styles," Newswire, Sep. 18, 2003. (abstract).

(No author), "Harris Corporation Awarded $ 13.6 Million Contract by Raytheon for U.S. Navy's DD-X-Phased Array Antenna Program," Newswire, pp. 5391, May 20, 2003. (abstract).

(No author), "Hughes Network Systems Europe Signs Value-added Reseller Agreement With Excelerate Technology Limited; Excelerate Will Market Satellite-Based VPN Service to UK & European Enterprises," Newswire, Sep. 16, 2003. (abstract).

(No author), "Infineon Enhances Leadership Position in Optical Communications, Adds XFP Modules to Expand 'Single-Source' 10 Gbps Portfolio," Newswire, p. 5454, Mar. 10, 2003. (abstract).

(No author), "Japan's T-Engine Forum and MontaVista Software Create Enhanced Ubiquitous Computing Platform," Newswire, pp. 5634, Mar. 18, 2003. (abstract).

(No author), "L-3 Communications Acquires Aeromet, Inc.," Newswire, pp. 5204, Jun. 12, 2003. (abstract).

(No author), "L-3 Communications' WESCAM Awarded US$19 Million Contract to Provide MX-20 EO/IR Sensors for Canada's CP-140 Aurora Patrol Aircraft," Newswire, pp. 5302, Jul. 31, 2003. (abstract).

(No author), "Lightsurf Debuts Platform to Deliver Wireless Imaging," Imaging Update, vol. 12, No. 11, Nov. 1, 2001.

(No author), "Lockheed Martin and TRW to build of Milstar communications satellite replacement. (In Brief)," Military & Aerospace Electronics, vol. 13, No. 2, pp. 10(1), 2002.
(No author), "Lockheed Martin, TRW and Hughes Form Team on AEHF Satellite," Satellite.
(No author), "Matria Healthcare Signs Five New Employer Contracts for Obstetrical Disease Management Services," Newswire, pp. 2351, Feb. 12, 2003. (abstract).
(No author), "Metrocall Wireless Signs Agreement with controlGen, Remote Monitoring Equipment Innovator," Newswire, pp. 5771, Jun. 26, 2003. (abstract).
(No author), "Nextel and Aether Announce Availability of Aether PocketBlue Wireless Public Safety Application on Nextel Handsets," Newswire, pp. 5288, Mar. 5, 2003. (abstract).
(No author), "Nextel Delivers Wireless Solutions Ideal for Government; Priority Access, Emergency Group Connect and the r750plus AFU," Newswire, pp. 5091, Mar. 4, 2003. (abstract).
(No author), "Nextel Launches Wireless Imaging Broadcast and Email Messaging Solution for Public Safety," Newswire, pp. 5365, Jun. 12, 2003. (abstract).
(No author), "Nokia and F5 networks partnership delivers industry-leading internet traffic management solutions; Introducing Nokia BIG-IP Internet traffic management solutions," M2 Presswire, Publisher: M2 Communications Lts., Dec. 5, 2001.
(No author), "Paradyne: AG & Paradyne announce 1st high-speed services with DSL equipment interoperability," M2 Presswire, Dec. 2, 1997. (abstract).
(No author), "PR Newswire Summary of High Tech Copy, Aug. 12, 2003," Newswire, Aug. 12, 2003. (abstract).
(No author), "Sony Online Entertainment Inc. Licenses WiredRed's TeamSound for Real-Time Voice Chat in PlanetSide; WiredRed Technology Brings Instant Voice Interaction to New Massively Multiplayer Online Game PlanetSide," Newswire, May 20, 2003. (abstract).
(No author), "SRI Gets DARPA Technology Development Contracts Jul. 3, 1997," Newsbytes, Jul. 3, 1997. (abstract).
(No author), "Study of the realizability and performance of focused-wave pulses," IEE Conference Publication n 365, 1992; Published by IEE, Michael Faraday House, Stevenage, England, pp. 126-129, 1992. (abstract).
(No author), "Telehublink Signs Licensing Pact With Improv Systems," Electro Manufacturing, vol. 13, No. 9, Sep. 1, 2000.
(No author), "Telephony: AT&T Wireless Services will begin distributing Bloomberg Financial Markets information to customers with PocketNet wireless phones," Communications Daily, vol. 17, No. 82, Apr. 29, 1997. (abstract).
(No author), "Telephony: Cincinnati Microwave (CM) agreed to sell digital spread spectrum cordless phone technology to Xsys New Media Technologies for $300,000," Communications Daily, vol. 17, No. 82, Apr. 29, 1997. (abstract).
(No author), "Telephony: Fitel Lucent Technologies loose tube fiber venture began 2nd phase of Ga. expansion this week," Communications Daily, vol. 17, No. 82, Apr. 29, 1997. (abstract).
(No author), "Telephony: Mich. PSC last week authorized Midcom Communications to provide local exchange service," Communications Daily, vol. 17, No. 82, Apr. 29, 1997. (abstract).
(No author), "Telephony: Northern Telecom and Communications Intelligence Corp. formed joint effort to define standards for new wireless devices," Communications Daily, vol. 17, No. 82, Apr. 29, 1997. (abstract).
(No author), "Telephony: Sentient Networks arranged $13 million in new financing from AT&T Ventures," Communications Daily, vol. 17, No. 82, Apr. 29, 1997. (abstract).
(No author), "U.S. Air Force awards Lockheed Martin, TRW team $2.698 billion contract to begin System Development and Demonstration phase of next generation military communications satellite program," M2 Presswire, Publisher: M2 Communications Ltd. Nov. 19, 2001.
(No author), "Verizon Wireless to Offer High-Speed Wireless Broadband Services for Business Customers," Newswire, Mar. 17, 2003. (abstract).
(No author), Vivato Leverages Wi-Fi Technology to Deliver New Economics to Wireless.
(No author), "Washington Group International Introduces New Sys Bear Facts about Shedding Weight and Feeling Great; New Guide Provides Step-by-step Approach for Going from Sluggish to Sizzling in Six Weeks," Newswire, Feb. 27, 2003. (abstract).
Ali et al., "Fabrication and characterization of HTS antennas for satellite communication and security system," Asia Pacif Microwave Conf Proc APMC, pp. 16, 2000. (abstract).
Chunpei (ed.), "ICCT'98. 1998 International Conference on Communication Technology. Proceedings (IEEE Cat. No. 98EX243)," Beijing, China, Oct. 22-24, 1998. (abstract).
Crouch et al., "The realisation of GainP/GaAs power HBTs," 1996 High Performance Electron Devices for Microwave and Optoelectronic Applications Workshop—EDMO, pp. 33-36, New York, NY, Nov. 25-26, 1996. (abstract).
Gold, "Cylink Security Used In Bluetooth Transmission Technology," Newsbytes, Sep. 27, 2000.
Heidary, "Ultra-wideband antenna arrays," IEEE Antennas and Propagation Society International Symposium. 2001 Digest. Held in conjunction with: USNC/URSI National Radio Science Meeting, Boston, MA, Jul. 8-13, 2001. (abstract).
Ohshima et al., "Fabrication and characterization of HTS antennas for satellite communication and security system," 2000 Asia-Pacific Microwave Conference. Proceedings, pp. 604-607, 2000. (abstract).
Papanicolaou, "Signals, Waves and Transport," Technical Report, Stanford University, Standford, CA, Jan. 1, 2001 [Report Nos. AD-A395137; AFRL-SR-BL-TR-01-0525]. (abstract).
Ponnekanti et al., "Integrated location management in mobile multimedia networks and its role in the development of human tracking systems," VTC2000—Spring; 2000 IEEE 51st Vehicular Technology Conference Proceedings; May 15-18, 2000. (abstract).
Ponnekanti et al., "Investigations into integrated location management in mobile multimedia networks," First International Conference on 3G Mobile Communication Technologies, Mar. 27-29, 2000. (abstract).
Rahman et al., "REmote synchromization of high-frequency chaotic signals in semiconductor lasers for secure communications," Optics Communications, vol. 138, No. 1-3, pp. 91-94, 1997. (abstract).
Sidiropoulos et al., "Deterministric waveform-preserving blind separation of DS-CDMA signals using an antenna array," Ninth IEEE Signal PRocessing Workshop on Statistical Signal and Array Processing, Portland, OR, Sep. 14-16, 1998. (abstract).
Tech, "AirNet Announces Successful Completion of Adaptive Array Field Trial; SuperCapacity AdaptaCell Base Station is Revolutionary and Unparalleled in Performance," Business Wire, pp. 1, Aug. 20, 2002. (abstract).
Toughlian et al., "True time delay transmit/receive optical beamforming system for phased arrays and other signal processing applications," Proceedings of the SPIE—The International Society of Optical Engineering, vol. 2155, pp. 181-191, 1994. (abstract).
Venkataraman et al., "Adaptive microstrip antenna arrays for wireless secutiry systems," Proceedings—SPIE, The International Society for Optical Engineering, Issue 3708, pp. 128-139, 1999. (abstract).
Vieira, "Mode-locked microchip lasers for millimeter-wave generation for optically fed wireless systems," LEOS 2000; 2000 IEEE Annual Meeting Conference Proceedings; 13th Annual Meeting, Nov. 13-16, 2000 (abstract).
Zmuda et al., "An Analysis of Delay Resolution for a True Time Delay Photonic Beamformer," Technical Report, Report Nos. AD-A304150, RL-TR-95-183, NIPS-96-48979; Final Report Oct. 1992-Mar. 1994. (abstract).
Zmuda et al., "True-time-delay photonic beamformer for an L-band phased array radar," Proceedings of SPIE—The International Society for Optical Engineering v 2560, 1995; Society of Photo-Optical Instrumentation Engineers, Bellingham, WA, USA; pp. 166-176, 1995. (abstract).

* cited by examiner

METHOD AND APPARATUS FOR IMPROVING THE EFFICIENCY AND ACCURACY OF RFID SYSTEMS

CROSS-REFERENCE TO RELATED APPLICATIONS

This application claims the benefit of U.S. Provisional Application No. 60/550,355, filed Mar. 5, 2004, U.S. Provisional Application No. 60/550,411, filed Mar. 5, 2004, U.S. Provisional Application No. 60/561,433, filed Apr. 12, 2004, U.S. Provisional Application No. 60/603,531, filed Aug. 20, 2004, and U.S. Provisional Application No. 60/613,428, filed Sep. 27, 2004, each of which is hereby incorporated by reference in its entirety.

BACKGROUND OF THE INVENTION

Radio Frequency Identification ("RFID") is a generic term for technologies that use radio waves to automatically identify individual items. Objects can be identified using RFID by storing a serial number that identifies the object on a chip that is attached to an antenna. The chip and the antenna together are called an RFID tag. An RFID reader sends out electromagnetic waves that are received by the antenna on the RFID tag. Passive RFID tags draw power from this electromagnetic field to power the chip. Active tags use their own batteries to power the chip. The tag responds to the reader by transmitting a bit stream to the reader that contains information about the tag (serial number, etc.). The current state of RFID technology is described by [1] K. Finkenzeller in "RFID Handbook" (John Wiley & Sons, 2003).

RFID systems operate at many different frequencies. The most common are low frequencies around 135 KHz, high frequencies around 13.56 MHz, ultra-high frequencies around 900 MHz, and microwave frequencies around 2.45 GHz and 5.8 GHz.

Current RFID systems are not suited for precise location of tags because readers transmit very broad beams that cause tags in a large region to respond. Moreover, when two or more tags respond simultaneously, the transmissions from the tags get scrambled and become unintelligible to the reader. This phenomenon is known as tag collision. Procedures that involve repeated transmissions of tag data have been developed to deal with tag collisions [1, Chapter 7]. However, the interrogation speed (number of tags interrogated per second) is reduced when a large number of repeated transmissions are needed, so it is desirable to reduce tag collisions as much as possible.

The RFID reader's efficiency is related to its coverage or "accuracy," which is measured by the percentage of tags within range that are read correctly. The accuracy of today's readers is not acceptable for many applications, which require 100 percent accuracy. For example, a study published in the article "Smart Tags for Your Supply Chain," McKinsey Quarterly, 2003, Number 4, found that RFID-tagged pallets failed 3 percent of the time even when double-tagged, and only 78 percent of the individually tagged pallets were read accurately.

According to the article "RFID will present a stiff test," published in Supply Chain Management Review, Jan. 15, 2004, the main cause of low reader accuracy is the inability of readers to transmit enough power to activate tags that are surrounded by other objects such as tags affixed to items stored in the middle of a pallet. The article reports that ad hoc repositioning of the RFID tags or increasing reader power can often fix this problem.

The problem of reader collisions is another barrier to the large-scale deployment of RFID. Reader collisions can occur when the interrogation zones of two or more readers overlap. In the article "Why UHF RFID Systems Won't Scale," RFID Journal, July 2004, H. L. van Eeden states that "The main technical problem facing end-user companies is the possibility of large-scale reader interference that could render UHF RFID installations completely inoperable and severely limit the rollout of UHF RFID systems."

The problems of reader collision and low reader accuracy are related: if one attempts to solve the problem of low reader accuracy by increasing the reader power, then the interrogation zones grow and reader collisions become more frequent.

The following five U.S. Provisional Applications describe RFID readers that transmit data signals that cause the tags to respond and scramble signals that do not cause the tags to respond: [2] "Method and apparatus for secure transmission of data using array," U.S. Provisional Application No. 60/550,355, filed Mar. 5, 2004, [3] "Method and apparatus for preventing unauthorized transmitters from gaining access to a wireless network," U.S. Provisional Application No. 60/550,411, filed Mar. 5, 2004, [4] "Method and apparatus for precise location of RFID tags," U.S. Provisional Application No. 60/561,433, filed Apr. 12, 2004, [5] "Optically guided reader of RFID tags," U.S. Provisional Application No. 60/603,531, filed Aug. 20, 2004, and [6] "Method and apparatus for improving the efficiency of RFID systems," U.S. Provisional Applications No. 60/613,428, filed Sep. 27, 2004. These five provisional applications are incorporated herein by reference in their entirety.

The data and scramble signals are transmitted with different beams that are adjusted such that the scramble signals overshadow the data signals in all but selected regions. Hence, a tag will respond only if it is located in one of the selected regions, called the interrogation zones.

Provisional patent application [2] describes methods for using sum and difference patterns of array antennas to transmit data into selected narrow angular regions. The data signal is shielded by a scramble signal that makes the total transmitted signal unintelligible everywhere except in the narrow angular region. The scramble signal is also allowed to contain its own data that is different from the data carried by the data signal. Provisional patent application [2] further describes how the precise angular positions of RFID tags can be determined. Provisional patent application [4] describes how the width of the interrogation zone can be reduced and how the absolute location of a tag can be obtained from triangulation. Provisional patent application [5] describes how the interrogation zone can be visualized with optical sources. Provisional patent application [6] describes how the efficiency of RFID readers and reader networks can be improved through measurements, modeling, and inversion.

BRIEF SUMMARY OF THE INVENTION

The present invention is directed to a method for interrogating RFID tags comprising transmitting a data beam that causes the tags to respond, transmitting one or more scramble beams that do not cause the tags to respond, and adjusting the data beam and the scramble beams such that the scramble beams overshadow the data beam in all but selected regions. A tag can respond to the data signal either by broadcasting or changing its stored information. A scramble beam can contain a separate intelligible data stream and can charge tags that are not being interrogated.

In one embodiment of the present invention, the data signal bits are divided into two or more parts. For each part of the data signal, a corresponding scramble-beam direction is defined that is slightly away from the direction of the data beam. Each part of the data signal is then transmitted while the scramble beam has its central null steered towards a corresponding scramble-beam direction. The division of the data signal must be such that a tag responds only if it receives all the data bits.

In one embodiment of the present invention, the scramble signal is a sine wave. In one embodiment of the present invention, the scramble beams have approximately constant amplitudes away from their central null, so that the total radiated power from the reader is approximately omni-directional. Constant-amplitude scramble beams are achieved by moving zeros far off the Schelkunoff unit circle or by iterative methods.

In one embodiment of the present invention, the method further comprises employing two or more array readers that scan an area with data and scramble beams to determine the angular positions of each tag within range. In one embodiment the angular positions obtained with two or more readers determine the absolute position of the tags through triangulation. In one embodiment, anti-collision methods are employed when more than one tag responds at any given scan angle.

In one embodiment of the present invention, the reader and tags are inductively coupled and the reader employs two or more loops to transmit data and scramble signals. In one embodiment of the present invention, the loop configuration of the reader is optimized with iterative techniques to ensure that the magnetic field of the data signal is overshadowed by the magnetic field of the scramble signal except in selected regions.

In one embodiment the security measures described in [2] and [3] are employed to enhance the security of the RFID system.

The present invention is further directed to a method for optically displaying the interrogation zone of an RFID reader that includes the steps of attaching an optical source to an RFID reader and transmitting one or more light beams with said optical source to visualize the interrogation zone. In one embodiment of the present invention, the light beam is pointed in the direction of the center of the interrogation zone. In another embodiment of the present invention, two or more light beams are transmitted such that each light beam coincides with a boundary of the interrogation zone.

In a further embodiment of the present invention, a light beam is scanned back and forth between the boundaries of the interrogation zone. In another embodiment of the present invention, the light beams are transmitted with lasers.

In one embodiment of the present invention, the optical source is built into the housing of the RFID reader. In another embodiment of the present invention, the optical source is attached to the housing of the RFID reader.

The present invention is additionally directed to methods for improving the efficiency of RFID systems. In one embodiment of the present invention, the reader employs two antennas that broadcast both data and scramble signals. In one embodiment of the present invention, the antennas are patch antennas. In one embodiment of the present invention, the reader employs three antenna elements where two of them transmit the scramble signal and one interrogates the tags. In one embodiment of the present invention, the reader employs one standard commercially available reader and two additional antennas that broadcast a scramble signal. In one embodiment of the present invention, the array excitation coefficients for the data and scramble signals are adjusted to create an interrogation beam that precisely fits an opening in a container.

In one embodiment of the present invention, the reader employs an antenna that transmits two or more interrogation beams designed such that any tag in the interrogation zone receives sufficient power to operate from at least one of the interrogation beams. In one embodiment of the present invention, the reader employs two or more scramble beams to prevent leakage of the data signal. In one embodiment of the present invention, two sets of scramble-beam coefficients are mirror images.

In one embodiment of the present invention, a network of readers transmits both data and scramble beams adjusted to create closely spaced independent interrogation zones. In one embodiment of the present invention, the positions of the readers is determined from the solution of an inverse source problem. In one embodiment of the present invention, the excitation coefficients are determined from the solution to an inverse source problem. In one embodiment of the present invention, the inverse source problem is solved with an iterative optimization scheme.

In one embodiment of the present invention, the tags are placed at locations where the tag antenna creates maximum disruption of the field distribution. In one embodiment of the present invention, the field distribution on an object is computed with a numerical method.

In one embodiment of the present invention, an RFID reader uses a bistatic mode of operation. In one embodiment of the present invention, the RFID reader uses a multistatic mode of operation. In one embodiment of the present invention, the location of the RFID reader receivers are determined by solving a scattering problem with a model for a typical tagged item.

BRIEF DESCRIPTION OF THE DRAWINGS

FIG. 41 (Right) illustrates the ratio of total scramble beam to data beam of the reader on the right. Tags are interrogated only in the regions where a data beam dominates.

DETAILED DESCRIPTION OF THE INVENTION

The present invention provides (a) designs for RFID readers, (b) a method for reducing the width of the interrogation region, (c) a method for providing a user defined interrogation zone for one or more readers, (d) a method for location of transceivers in 2D and 3D using more than one information-steering transmitter, (e) a method for precise tag location that works in the induction regime where the wavelength is much longer than the physical dimensions involved, (f) a new set of security measures for RFID systems, (g) a method for optically displaying the interrogation zone, (h) a method for overcoming multipath effects, (i) a method for optimal tag placement, and (j) a bistatic RFID reader. A common feature in items (a)-(f) is that two or more signals are transmitted simultaneously, including:

1. A data signal that causes the tags to respond. The data signal may instruct the tags to broadcast or modify stored information. The data signal may contain information about scan angles that the tags can retransmit back to the reader. Also, the data signal may employ any of the methods developed to solve the problem of tag collision that occurs when two or more tags transmit simultaneously [1, Chapter 7].
2. One or more scramble signals that do not cause the tags to respond. The tags neither broadcast nor modify their stored information. A pure sine wave works as a scramble signal for UHF tags. The scramble signals can be used to charge the tags and to convey a separate intelligible information stream. The scramble signal can also be referred to as a guard signal.

A reader is said to employ information steering when it transmits both data and scramble signals. The present invention makes extensive use of antenna arrays. The following references describe the theory and design of phased arrays: R. C. Hansen, "Phased Array Antennas," John Wiley & Sons, 1998; R. J. Mailloux, "Phased Array Antenna Handbook," Artech House, 1994; and, R. S. Elliot, "Antenna Theory and Design," IEEE Press, 2003. With adaptive phased arrays, also known as smart antennas, the received signals and environmental parameters are fed to powerful processors that steer the beams to optimize performance. The technology for designing and constructing adaptive phased arrays with hundreds of elements that produce prescribed sum and difference patterns has reached a mature stage, as described in the following references: M. I. Skolnik, "Radar Handbook," McGraw-Hill, 1990, 2nd edition; R. T. Compton, "Adaptive Antennas," Prentice-Hall, 1998; and, G. V. Tsoulos, ed. "Adaptive Antennas for Wireless Communications," IEEE Press, 2001.

Two types of array patterns widely used in radar applications are of particular interest to the present invention: (1) the sum pattern and (2) the difference pattern, the relevance of which will be seen in the context of FIG. 1.

Linear Arrays

Figure 1:
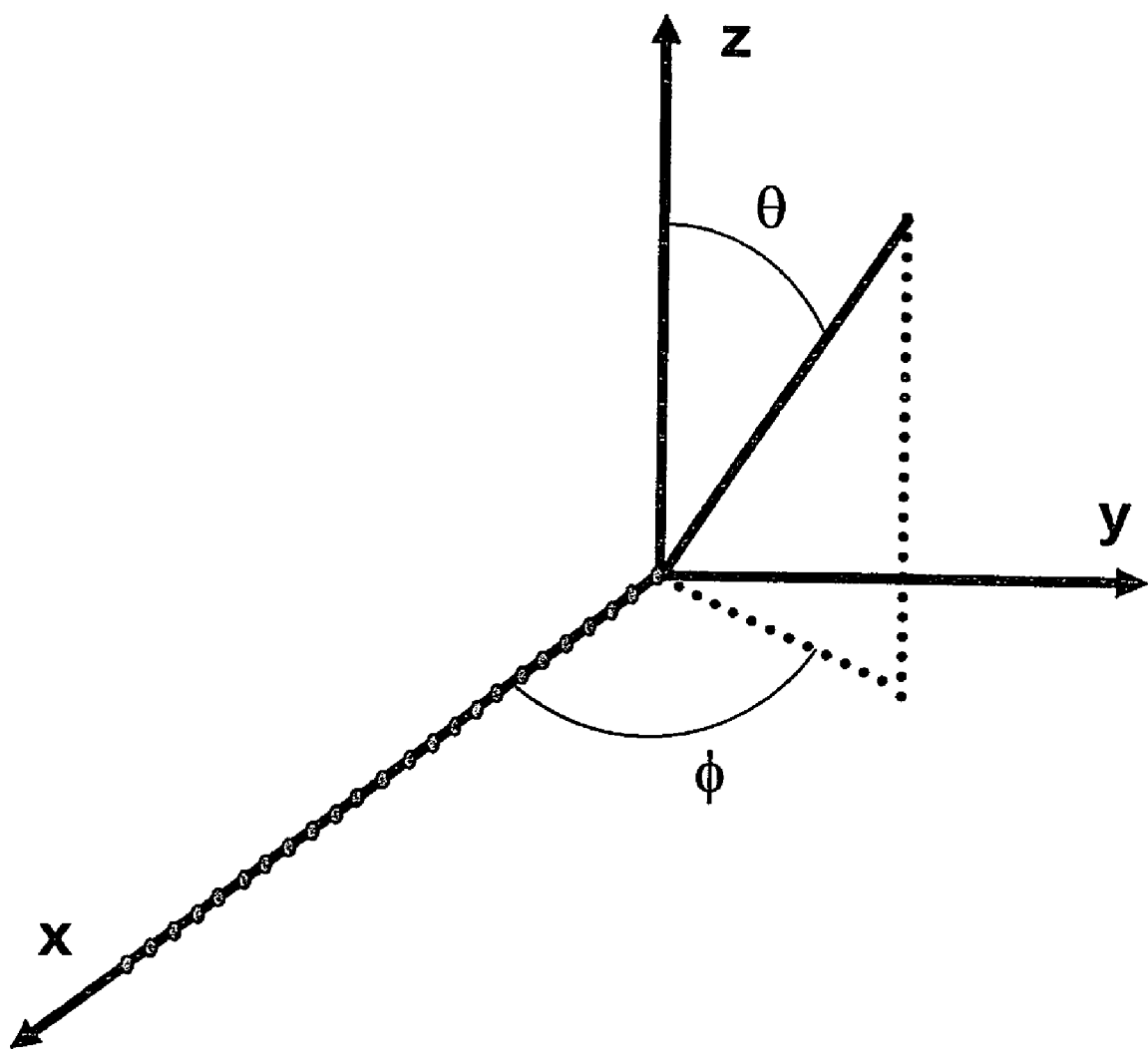
FIG. 1 illustrates an 18-element linear array.

FIG. 1 is a graph of a linear array with 18 elements having element spacing of half of a wavelength. The data time signal is represented by a(t), which depends on the chosen modulation and coding techniques, and on the transfer functions of the antenna elements. The present invention works for any modulation and coding techniques and for any set of array elements.

In standard operation, one would feed array element #p with a signal of the form:

$$T_p(t) = A_p a(t - \alpha_p)$$

where $A_p$ is the excitation coefficient and $\alpha_p$ is the time delay. Generally, one could feed each array element with time functions that have different time dependence to compensate for array imperfections, end-element effects, or array elements differences. Such adjustments would be well known and straightforward to those working in this area. Therefore, it is assumed presently that the time dependence of each input signal is the same (the amplitudes and time delays are different). The array excitation coefficients and time delays ($A_p$ and $\alpha_p$, p=1, 2, ..., N, where N is the number of elements) are determined by standard methods to achieve a desired radiation pattern of the array that adapts to its environment.

Figure 2:
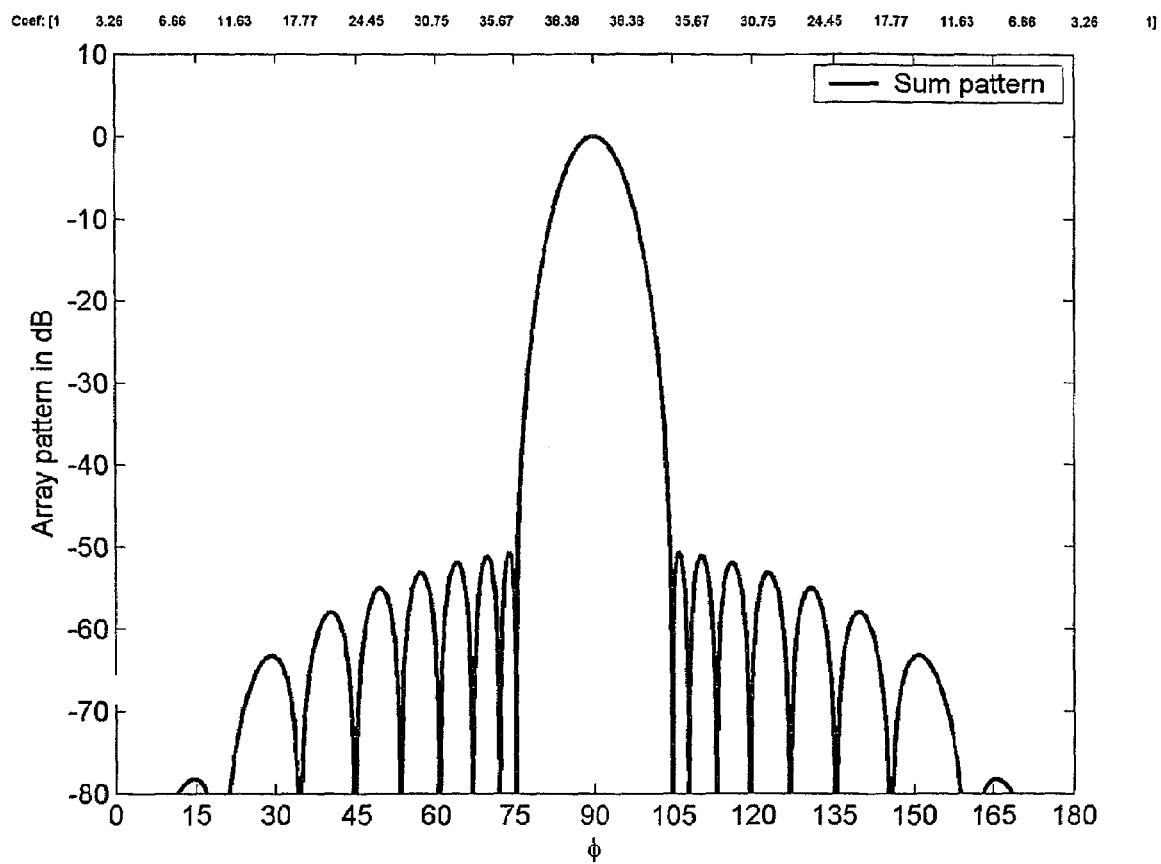
FIG. 2 illustrates a sum pattern of the 18-element array evaluated at $\theta=90°$. The excitation coefficients are shown above the plot.

FIG. 2 is a graph of a sum pattern of the 18 element array in FIG. 1, evaluated at θ=90°. A typical array radiation pattern and the associated excitation coefficients are shown in FIG. 2 for the 18-element linear array shown in FIG. 1. The element spacing is equal to half a wavelength. All time delays are zero, so the array operates in broadside mode. Since all the excitation coefficients have the same sign, the array radiates a sum pattern, which is characterized by a main beam and side lobes that are below a certain level (−55 dB in the embodiment shown in FIG. 2). Beam steering can be achieved by assigning nonzero values to the time delays, which results in the complex excitation coefficients $A_p \exp(i2\pi f_0 \alpha_p)$ when the $\exp(-i2\pi f_0 t)$ time dependence is suppressed and $f_0$ is the frequency at which the sum pattern is evaluated. These issues are well known to those working in this area.

Figure 3:
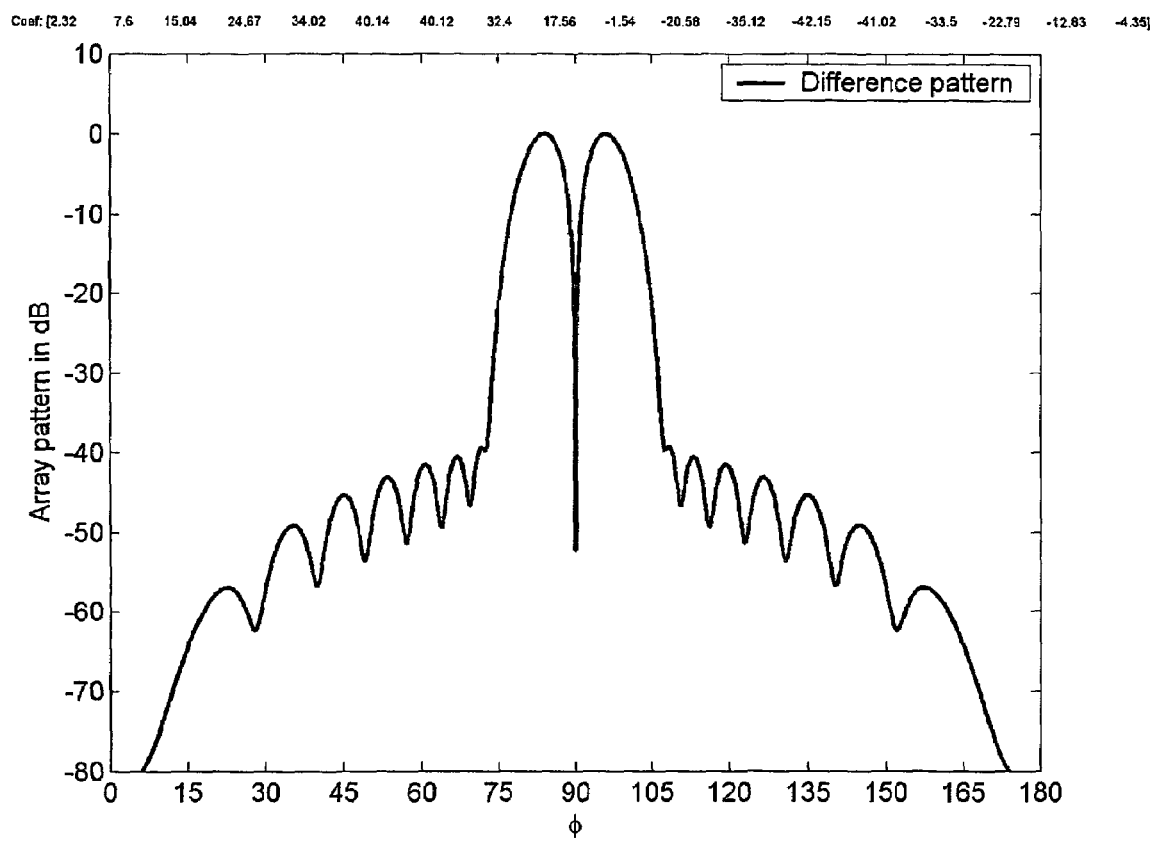
FIG. 3 illustrates a difference pattern of the 18-element array evaluated at $\theta=90°$. The excitation coefficients are shown above the plot.

In addition to the sum pattern, a difference pattern may be broadcast. A difference pattern and the associated excitation coefficients are shown in FIG. 3 for the 18-element array shown in FIG. 1. The difference pattern has a deep null in the center that is surrounded by two steep peaks. The term "difference pattern" is used because half of the excitation coefficients are positive and the other half negative. The time delays in FIG. 3 are all zero. As seen for the sum pattern, beam steering can be achieved by assigning nonzero values to the time delays.

A narrow interrogation zone is obtained with the present invention by feeding each element with a total signal that is obtained by adding at least one scramble signal to the data signal. In the case of one scramble signal b(t), the total input signal to array element #p is:

$$T_p(t) = A_p a(t - \alpha_p) + B_p b(t - \beta_p)$$

where $B_p$ (p=1, 2, ..., N) are the excitation coefficients and $\beta_p$ (p=1, 2, ..., N) are time delays for the scramble signal. This arrangement of signals creates a narrow interrogation zone when the data excitation coefficients $A_p$ (p=1, 2, ..., N) produce a sum pattern and the scramble excitation coefficients $B_p$ (p=1, 2, ..., N) produce a difference pattern. To steer the sum and difference beams in the same direction, one simply sets $\alpha_p = \beta_p$.

Figure 4:
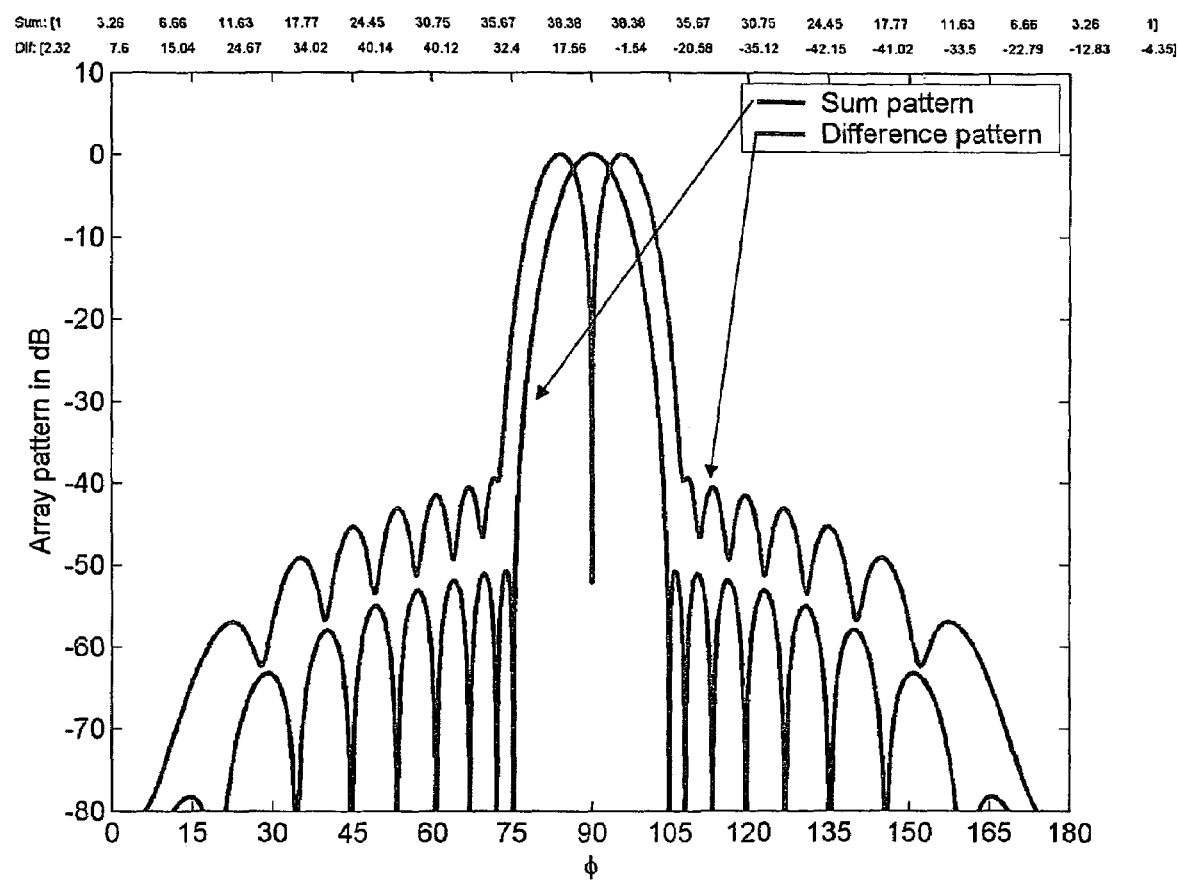
FIG. 4 illustrates the sum and difference patterns of the 18-element array evaluated at $\theta=90°$. Both sets of excitation coefficients are shown above the plot.

To see how the narrow interrogation zone is provided, the sum and difference patterns of FIGS. 2 and 3 are plotted together as shown in FIG. 4. The data signal a(t) is transmitted through the sum pattern, and the scramble signal is transmitted through the difference pattern. An observer located at the nulls of the difference pattern will receive only the data signal. Conversely, an observer located at nulls of the sum pattern will receive only the scramble signal. In most locations, however, there are no nulls and an observer would receive a weighted sum of the data and scramble signals. The weights are simply the sum and difference patterns at that particular location.

As shown by way of example in FIG. 4, it is evident that everywhere outside the narrow angular region $87°<\phi<93°$, the difference pattern is greater in magnitude than the sum pattern. Hence, an observer located at the angle $\phi$ will receive the following signals:

$\phi=90°$: the pure data signal a(t).

$87°<\phi<93°$: a weighted sum of data and scramble signals in which the weight for the data signal is greatest.

$0°<\phi<87°$ or $93°<\phi<180°$: a weighted sum of data and scramble signals in which the weight for the scramble signal is greatest.

Consequently, in this example, only observers in the narrow angular region $87°<\phi<93°$ will understand the data signal. Additionally, the angular region in which the data signal can be understood is likely even narrower due to noise.

Planar Arrays

Figure 5:
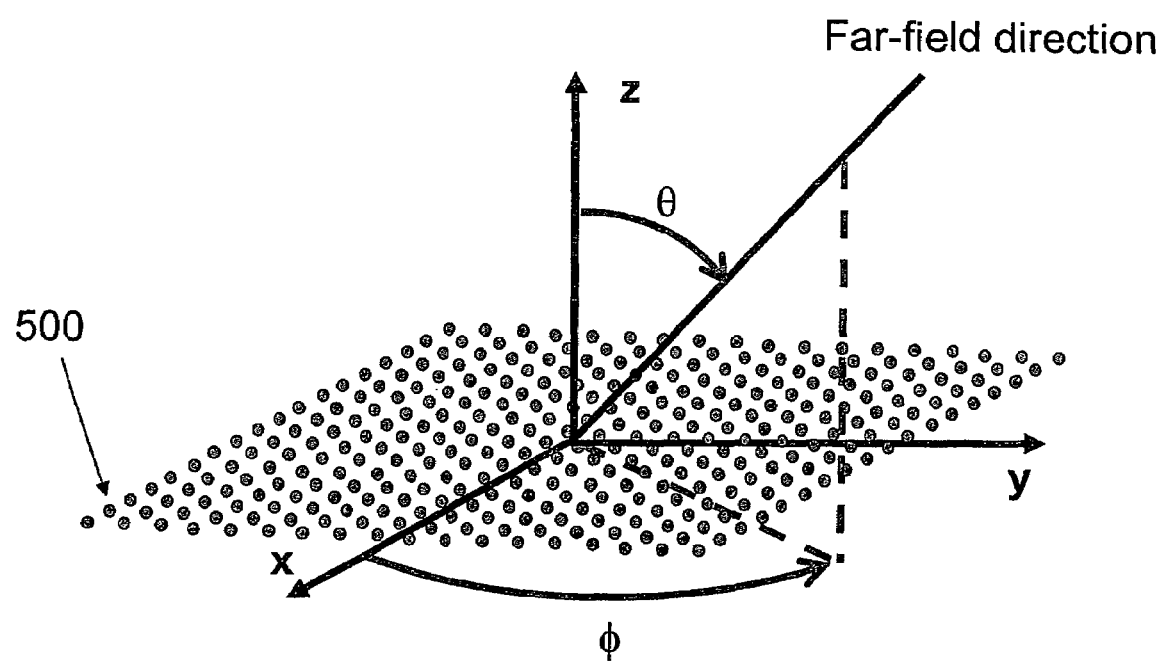
FIG. 5 illustrates a square planar array with 324 elements.
Figure 6:
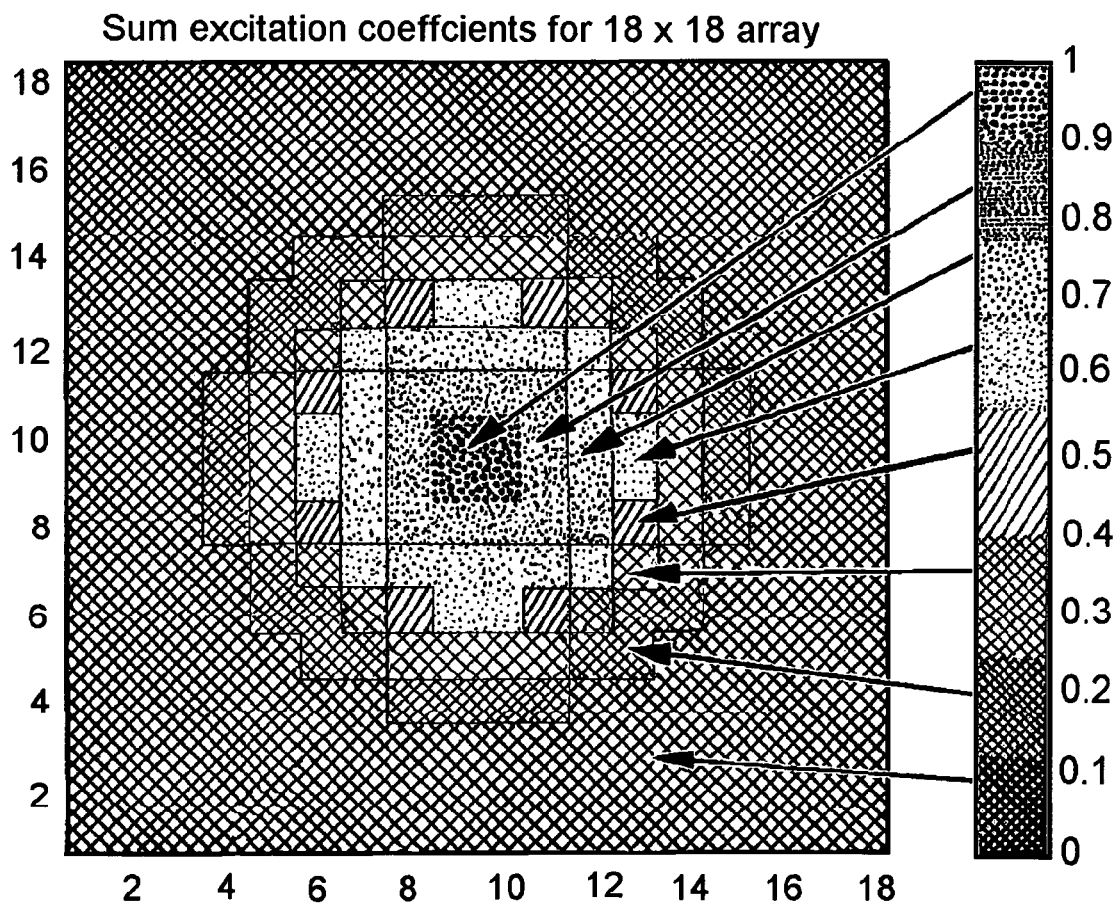
FIG. 6 illustrates a mapping of the excitation coefficients for the sum pattern of the 324-element planar array.
Figure 7:
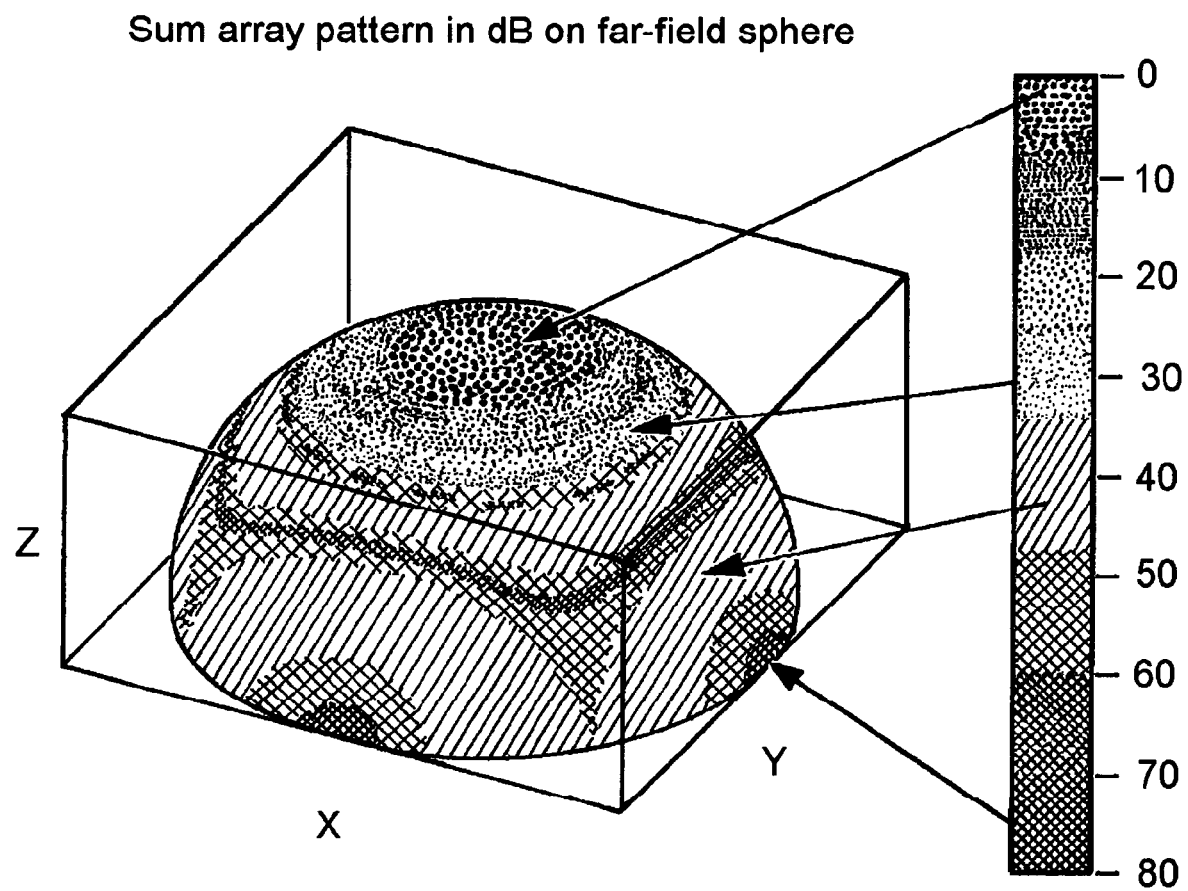
FIG. 7 illustrates a 3-D mapping of the array sum pattern corresponding to the excitation coefficients.

The present invention may also be used with planar arrays such as the 324-element array (18 elements by 18 elements) shown in FIG. 5. The element spacing is half a wavelength. FIG. 6 shows a typical set of sum excitation coefficients, and FIG. 7 shows the corresponding array sum pattern. The array pattern is almost independent of $\phi$ and has a main beam in the broadside direction. Standard methods, as previously noted, can be used to steer the beam in any desired direction.

Figure 8:
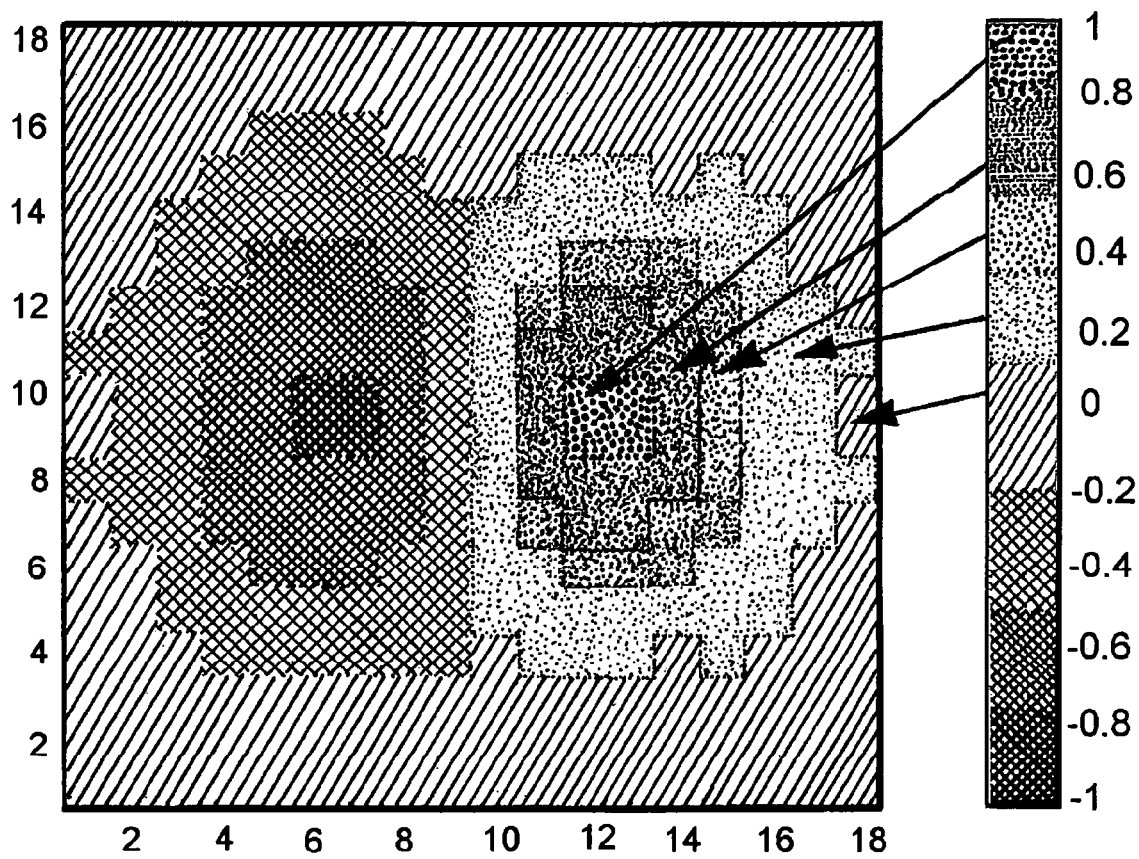
FIG. 8 illustrates a mapping of the excitation coefficients for the cosine difference pattern of the 324-element planar array.

For planar arrays, the difference patterns with sharp nulls have $\cos(\phi)$ or $\sin(\phi)$ angular dependence. The $\phi$ independent difference patterns for planar arrays result in a broadening of the angular regions in which the signals are intelligible. FIG. 8 shows a set of difference excitation coefficients with $\cos(\phi)$ angular dependence, and FIG. 9 shows the corresponding difference pattern.

The excitation coefficients for both the sum and difference patterns for the planar array may be obtained with semi-analytical methods to achieve prescribed side lobe levels and main beam widths. Alternatively, the coefficients may be obtained with nonlinear optimization techniques. The coefficients as shown in FIGS. 6 and 8 are obtained with the MATLAB™ function FMINUNC, which minimizes a user-defined cost function. The cost function is designed to ensure that the side lobes are below a certain level for all $\phi$.

Figure 9:
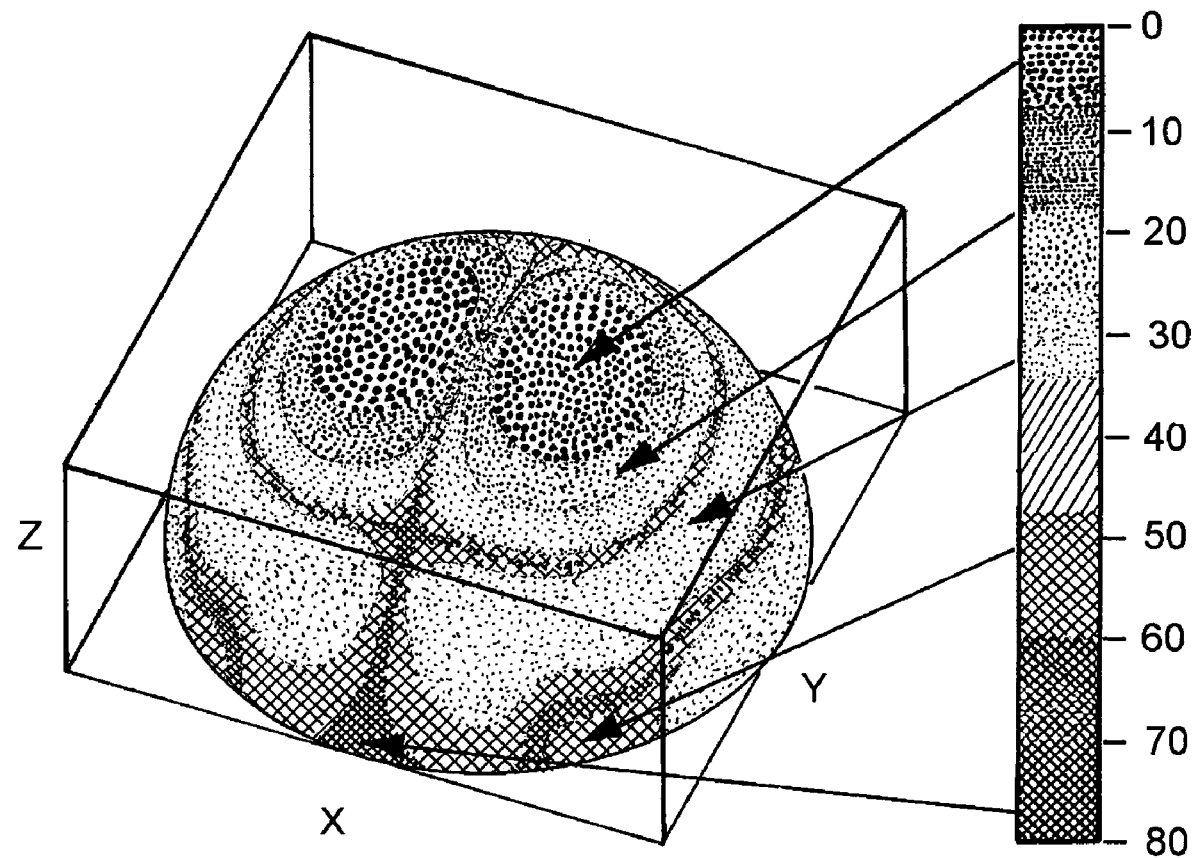
FIG. 9 illustrates a 3-D mapping of the array difference pattern corresponding to the excitation coefficients.

The difference pattern shown in FIG. 9 has a null for $\phi=90°$ and $\phi=270°$. With only one difference beam, the data signal leaks out at observation points with $\phi=90°$ or $\phi=270°$. Therefore, at least two difference beams are used for a planar array. The excitation coefficients and array pattern for a $\sin(\phi)$ difference pattern are obtained by rotating the plots as shown in FIGS. 8 and 9 ninety degrees around the z axis. The input to array element #p is therefore a sum of the three terms:

$$T_p(t)=A_p a(t-\alpha_p)+B_p b(t-\beta_p)+C_p c(t-\chi_p)$$

where $B_p$ and $C_p$ are the excitation coefficients, $\beta_p$ and $\chi_p$ are time delays, and b(t) and c(t) are the scramble signals applied to the $\cos(\phi)$ and $\sin(\phi)$ difference patterns, respectively (p=1, 2, ..., N). As before, $A_p$ (p=1, 2, ..., N) are the excitation coefficients and $\alpha_p$ (p=1, 2, ..., N) are the time delays for the data signal. With at least two independent scramble signals, one achieves a narrow interrogation zone around $\theta=0°$. To steer the sum and difference beams in the same direction, one simply sets $\alpha_p=\beta_p=\chi_p$.

Other Antennas

Figure 10:
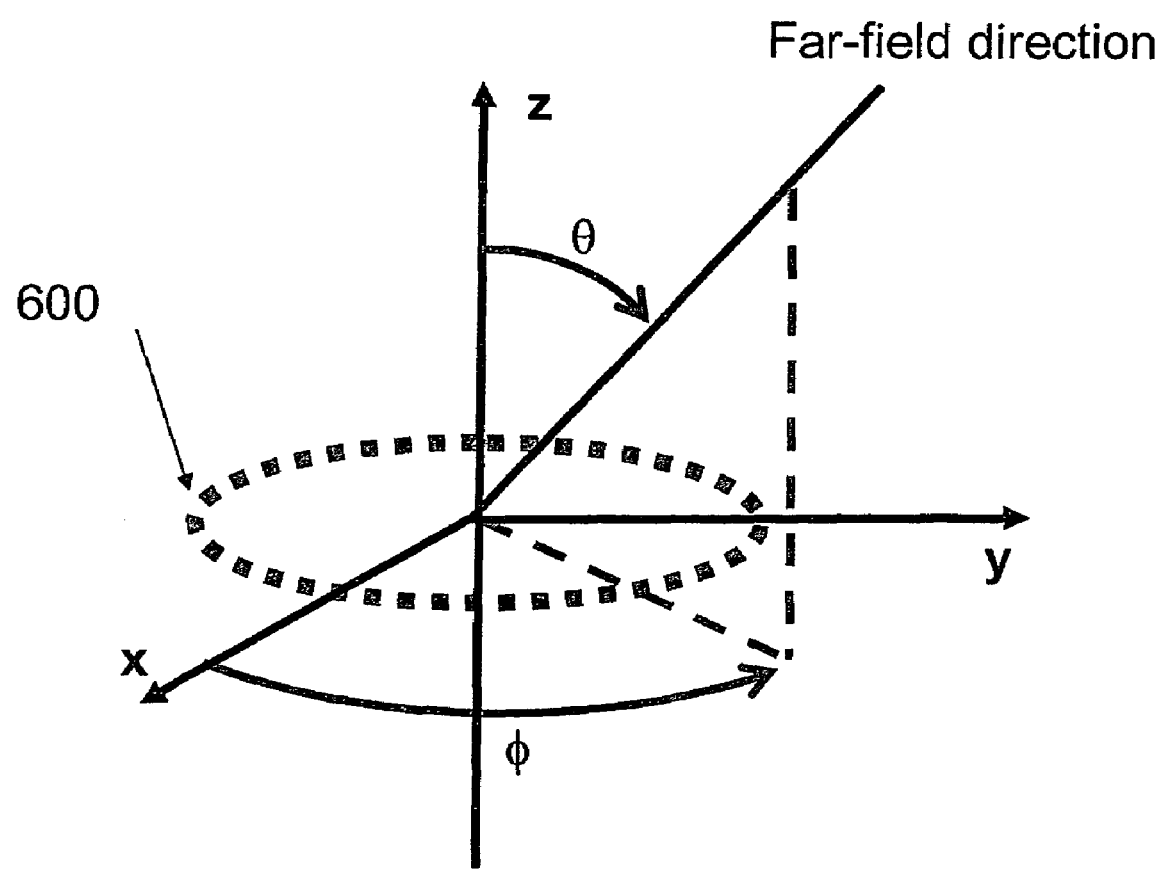
FIG. 10 illustrates a circular ring array.
Figure 11:
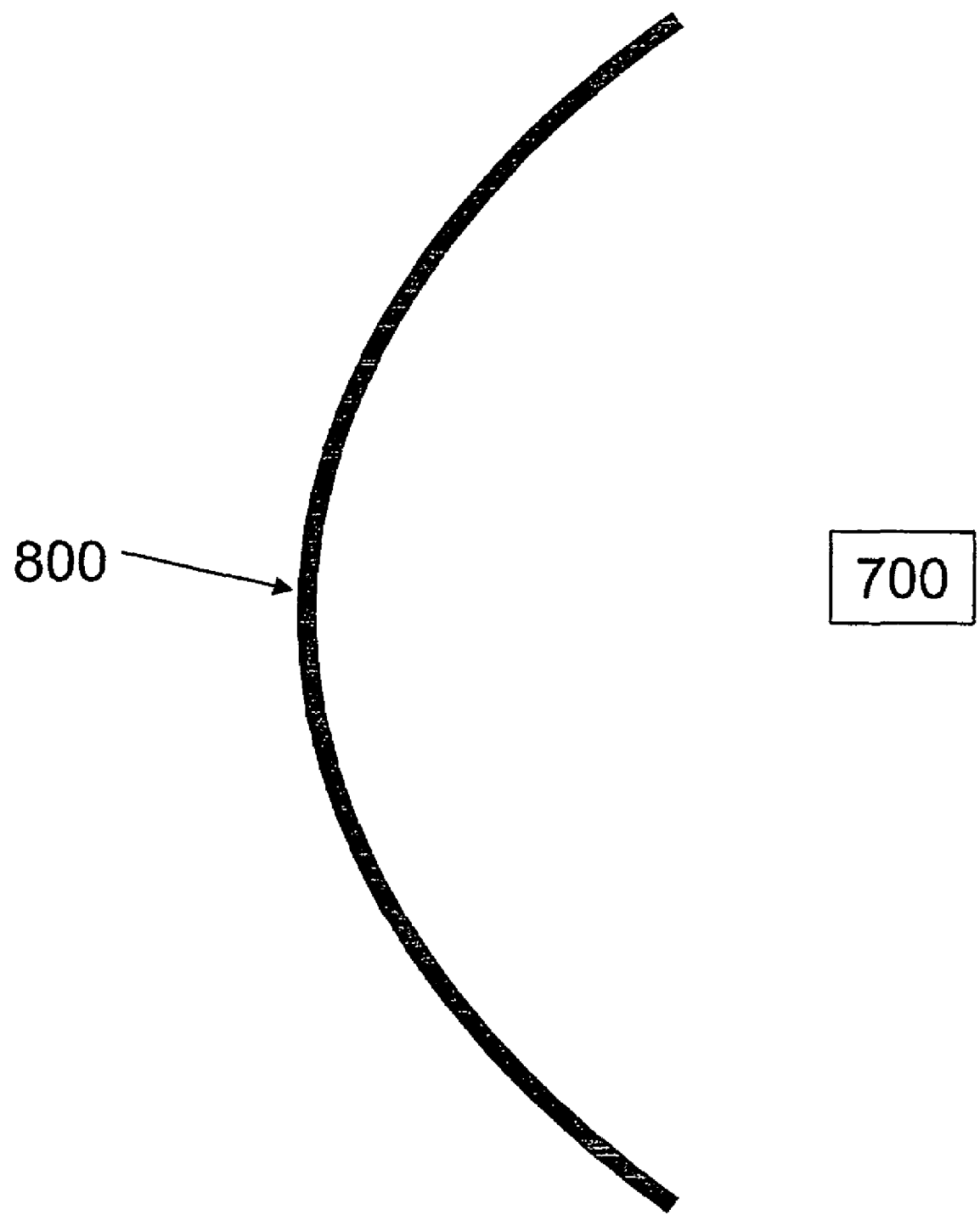
FIG. 11 is a perspective view of a reflector antenna with its feed at the focal point.

User defined interrogation zones in accordance with the present invention may also be achieved with arrays that are neither linear nor planar. For example, the circular ring array shown in FIG. 10 is useful for providing 360° coverage. For ring arrays, the interrogation zones can be obtained with sum and difference patterns obtained from standard theory. Similar interrogation zones can be realized with reflector antennas as shown in FIG. 11 by applying the present invention to its feed, which is typically a smaller antenna located at the focal point. More generally, one may use the present invention for any antenna type to obtain sum and difference patterns that can be combined to achieve the desired interrogation zones.

For purposes of illustration, the examples herein are confined to sum and difference patterns because such patterns have been studied extensively in the radar literature. Interrogation zones in accordance with the present invention can be achieved, however, with any combination of array patterns in which one of the patterns (the "difference pattern") has a null in the direction of the tags of interest and is larger in magnitude than the other pattern (the "sum pattern") in directions where other tags may be present.

The difference patterns must be slightly broader than the sum patterns to achieve the desired interrogation zones. The numerical examples presented herein demonstrate that difference patterns may be designed to have beam widths that are just slightly broader than the beam widths of the corresponding sum patterns.

A Four-Element Reader

Figure 12:
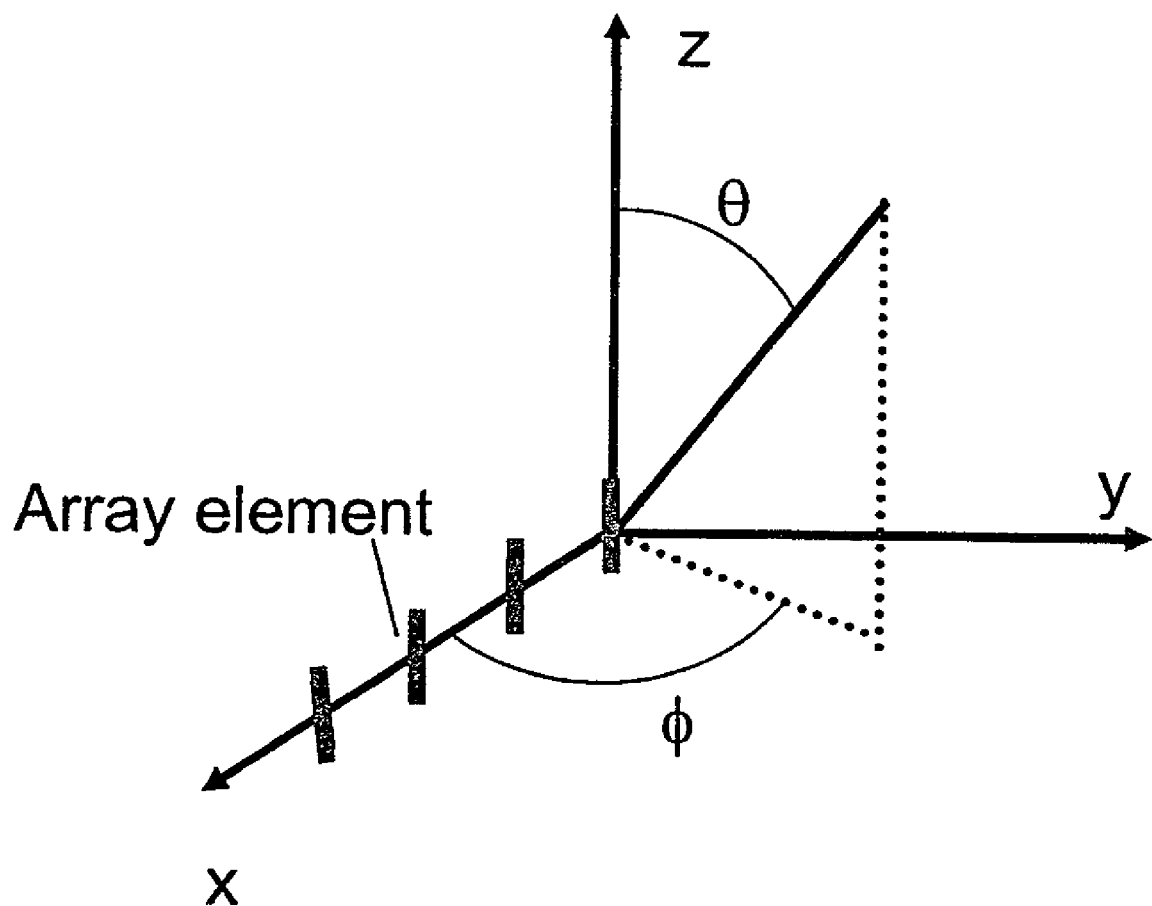
FIG. 12 illustrates a linear array with 4 elements having element spacing equal to 10 cm.

Consider a four-element tag reader operating at frequencies around 900 MHz. (RFID systems are allowed to operate at 915 MHz in the United States and at 869 MHz in Europe.) FIG. 12 shows a four-element array for a hand-held tag reader operating around 900 MHz, with element spacing=10 cm and total array length=30 cm. The tags to be interrogated are near the $(\theta,\phi)=(90°,90°)$ direction. As in [2], one feeds element #p with a signal of the form:

$$T_p(t)=A_p a(t)+B_p b(t)$$

where a(t) is the data signal and b(t) is a scramble signal. $A_p$ and $B_p$ are the excitation coefficients for the data and scramble signals, respectively.

Figure 13:
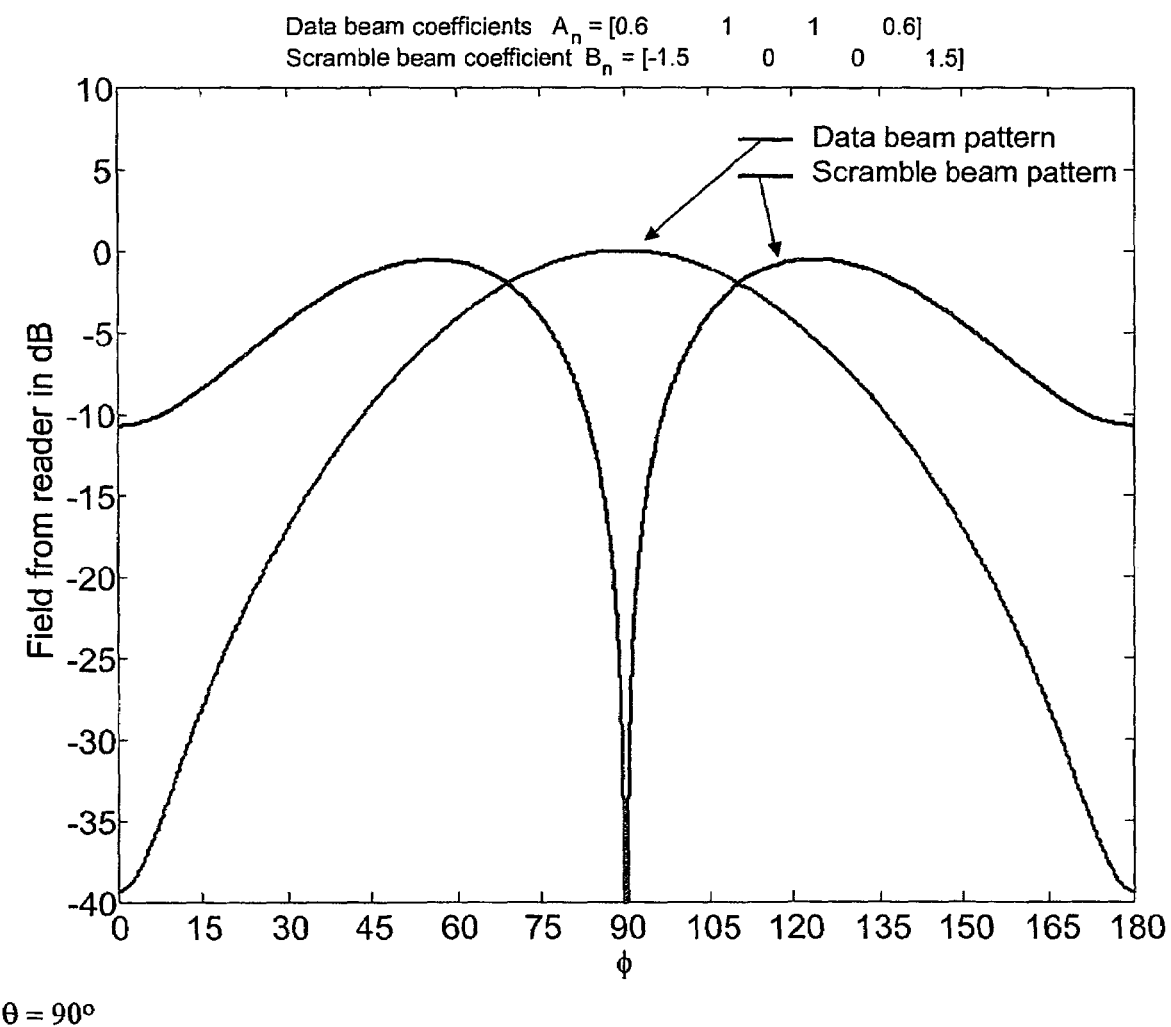
FIG. 13 illustrates data and scramble beams of the array in FIG. 12 evaluated at $\theta=90°$. The array elements are z-directed dipoles and both sets of excitation coefficients are shown above the plot.

FIG. 13 shows the far field of the reader for the case where the array elements are z-directed dipoles with array excitation coefficients given above the plot. This design results in a data-signal width of about 30 degrees. Hence, only those tags that are located in a 30 degree region centered on $\phi=90°$ will respond to this reader, allowing the operator to narrow the region in which a given tag is located. Since the z-directed dipoles are omni-directional in the $\theta=90°$ plane, the array radiates equal amounts of power in the forward and backward directions.

Figure 14:
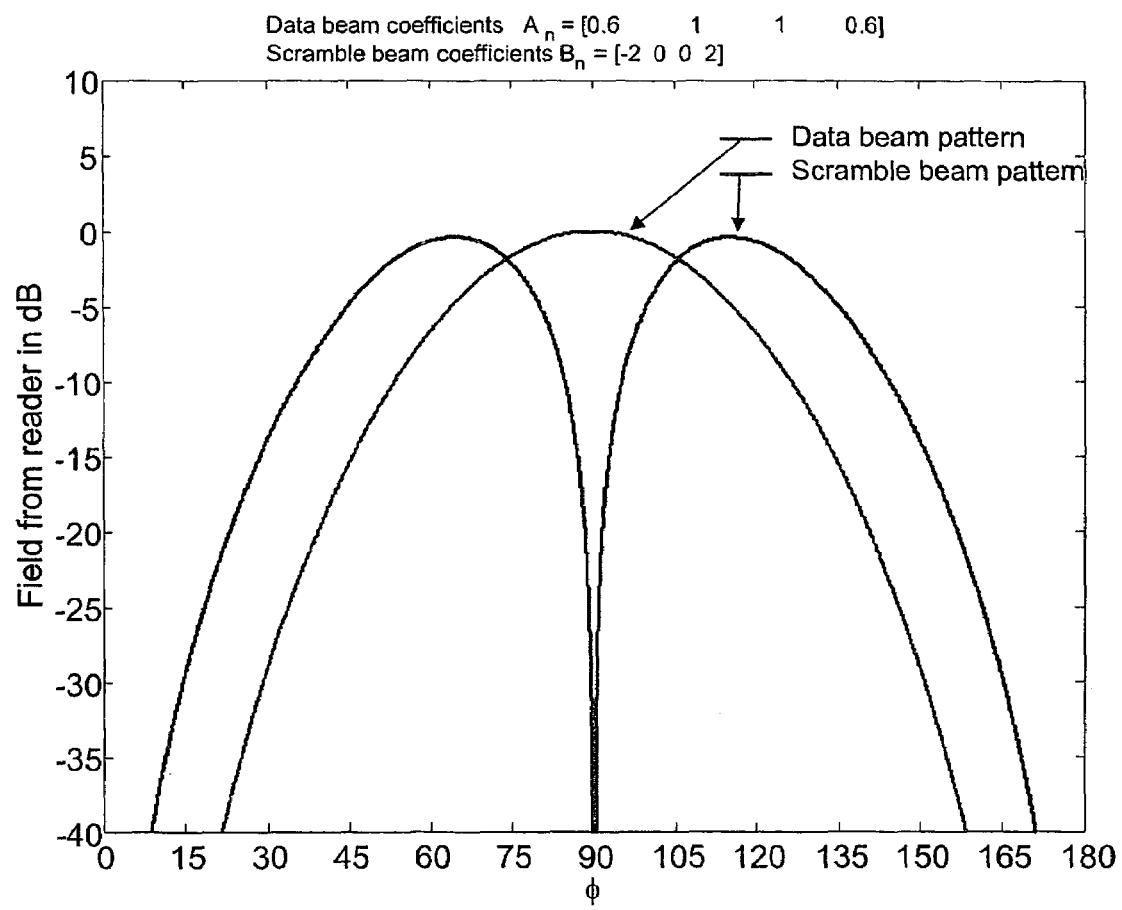
FIG. 14 illustrates data and scramble beams of the array in FIG. 12 evaluated at θ=90°. The array elements are patch antennas and both sets of excitation coefficients are shown above the plot.

The present invention also contemplates a design for a hand-held reader that radiates little energy in the backward direction (towards the operator). Assume that the array elements are made of patch antennas with $\sin^2(\phi)$ radiation patterns in the forward direction and very low radiation pattern in the backward direction. FIG. 14 shows the field of this reader for forward directions $0<\phi<180°$. The patterns of the patch antennas ensure that the field in the backward directions $180°<\phi<360°$ is low.

A Method for Reducing the Width of the Data Beam

The width of the angular region of the data signal is reduced by dividing the data signal bits into two parts: the first part and the second part. The first part is transmitted while the scramble beam has its central null steered slightly to one side of the direction of the data beam. The second part of the data signal is transmitted while the scramble beam has its central null steered slightly to the other side of the direction of the data beam. The division of the data signal must be such that a tag responds only if it receives both the first and second part of the data signal.

Figure 15:
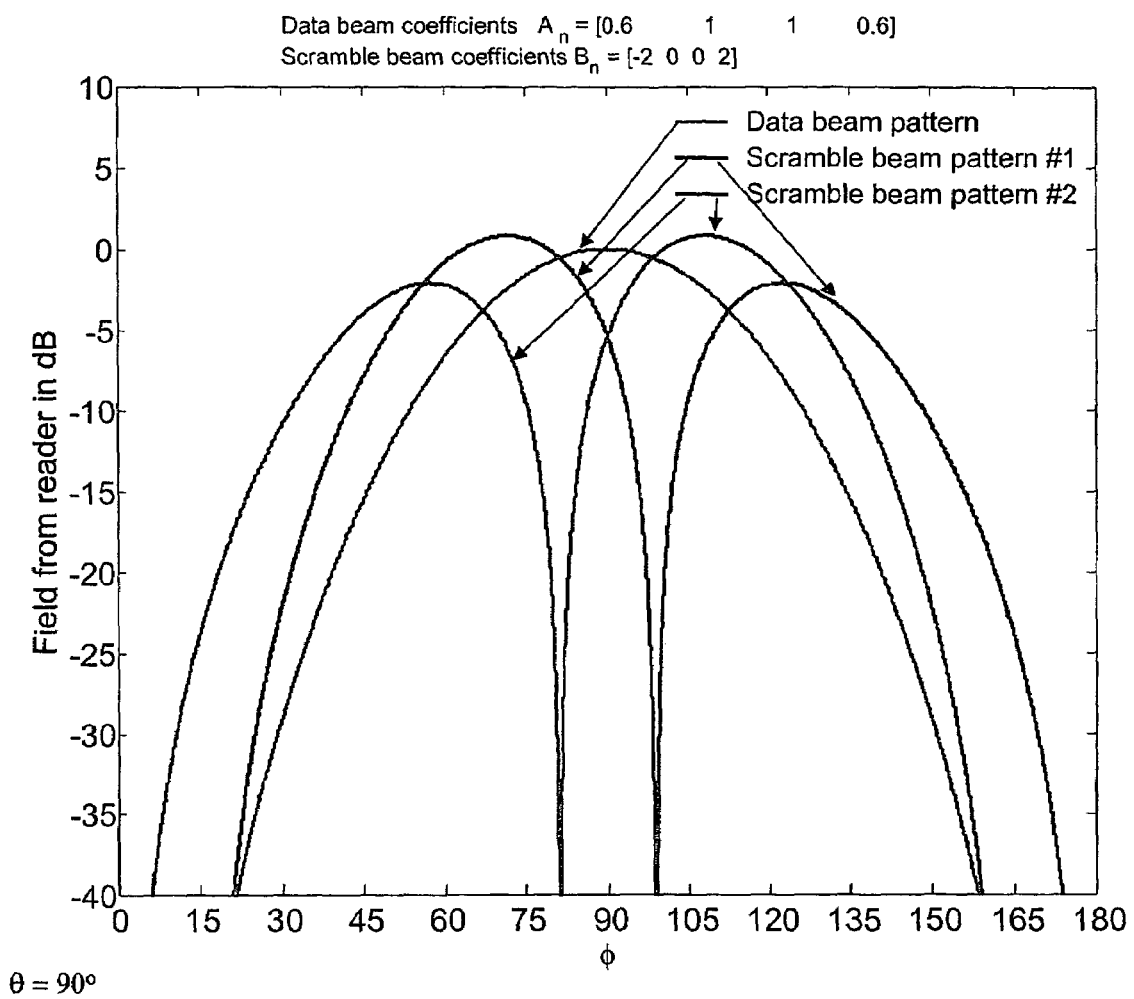
FIG. 15 illustrates one data beam and two scramble beams of the array in FIG. 12 evaluated at θ=90°. The array elements are patch antennas and both sets of excitation coefficients are shown above the plot.

FIG. 15 shows how this method can be implemented with the four-element array in FIG. 12, with patch antennas. Scramble beam #1 is obtained by steering the central null to $\phi=99°$. Scramble beam #2 is obtained by steering the central null to $\phi=81°$. The excitation coefficients are provided above the plot. A tag must then be located in a very narrow region (at most, 15° wide in this example) around $\phi=90°$ in order to receive both the first and second part of the data signal.

In principle, there is no lower limit on the width of the data-signal region obtainable with this method. One may even divide the data signal into three or more parts and employ three or more scramble beams, as long as the tags respond only if they receive all parts of the data signal. This method of reducing the width of the data-signal region works also for other the types of antennas described above and in [2]. In particular, the method works for planar arrays if the two scramble-beams nulls are steered in orthogonal directions (planar arrays require two scramble beams as explained above and in [2]). Another way of reducing the width of the data-signal region is to continuously vary the direction of the scramble beam while the data signal is being transmitted. Yet another way of reducing the width of the data-signal region is to increase the power of the scramble beam(s), and thereby move the scramble-beam shoulders above the peak of the data beam.

Systems that employ these highly localized data-signal beams may be used to locate tags or transceivers with such accuracy that they can replace more costly laser positioning systems. Such applications are discussed below.

A Constant-Level Scramble Beam

Figure 16:
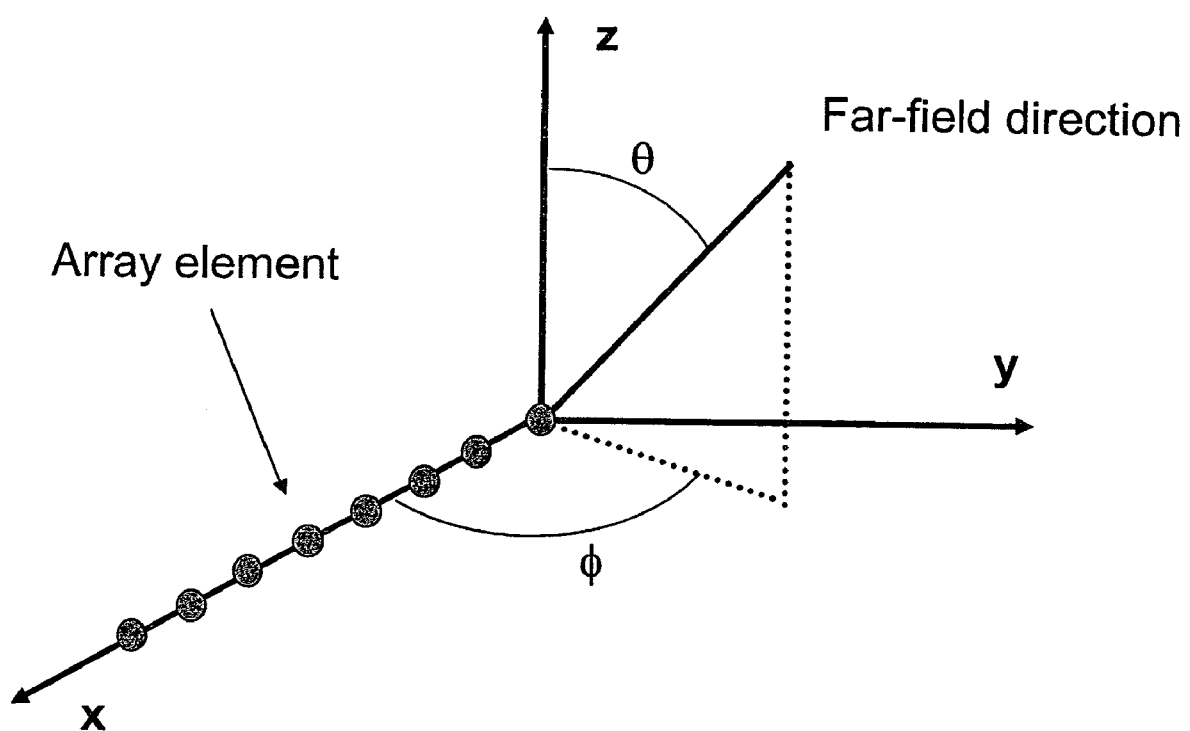
FIG. 16 illustrates a linear array with 8 elements having element spacing equal to 6.25 cm.

A reader can be designed such that its radiated power is omni-directional while its data signal stays highly directional. Consider the 8-element array in FIG. 16 that consists of z-directed dipoles and operates at 2.4 GHz, with element spacing=6.25 cm and the total array length=50 cm. The tags to be interrogated are near the $(\theta, \phi)=(90°, 90°)$ direction.

Figure 17:
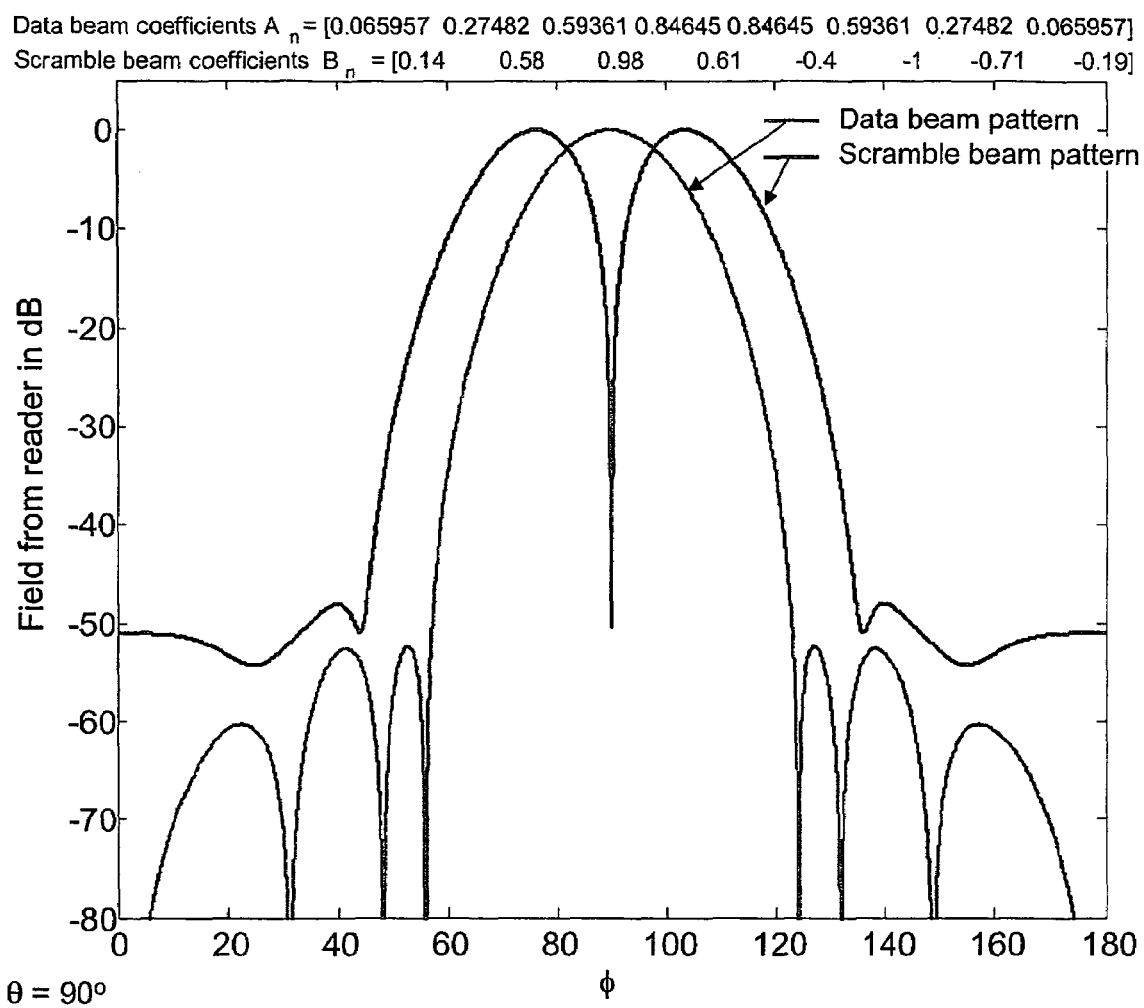
FIG. 17 illustrates one set of data and scramble beams of the array in FIG. 16 evaluated at θ=90°. The array elements are z-directed dipoles and both sets of excitation coefficients are shown above the plot.

Typical data and scramble beams for this array are shown in FIG. 17. All the zeros of the scramble beam, except the central one at $\phi=90°$, are moved radially off the Shelkunoff unit circle to points on a circle in the complex plane of radius 1.06. (The theory related to the Shelkunoff unit circle is described in the book "Antenna Theory and Design" by R. S. Elliot, IEEE Press, 2003.) As a result, the scramble beam has only one null (the central one) and stays above the data beam everywhere else. Notice that the scramble beam "follows" the data beam closely, so that the power of the scramble beam is extremely low away from a 60° angular region centered on $\phi=90°$. Hence, the reader provides little energy to charge or communicate with the tags that are located outside this 60° angular region.

Figure 18:
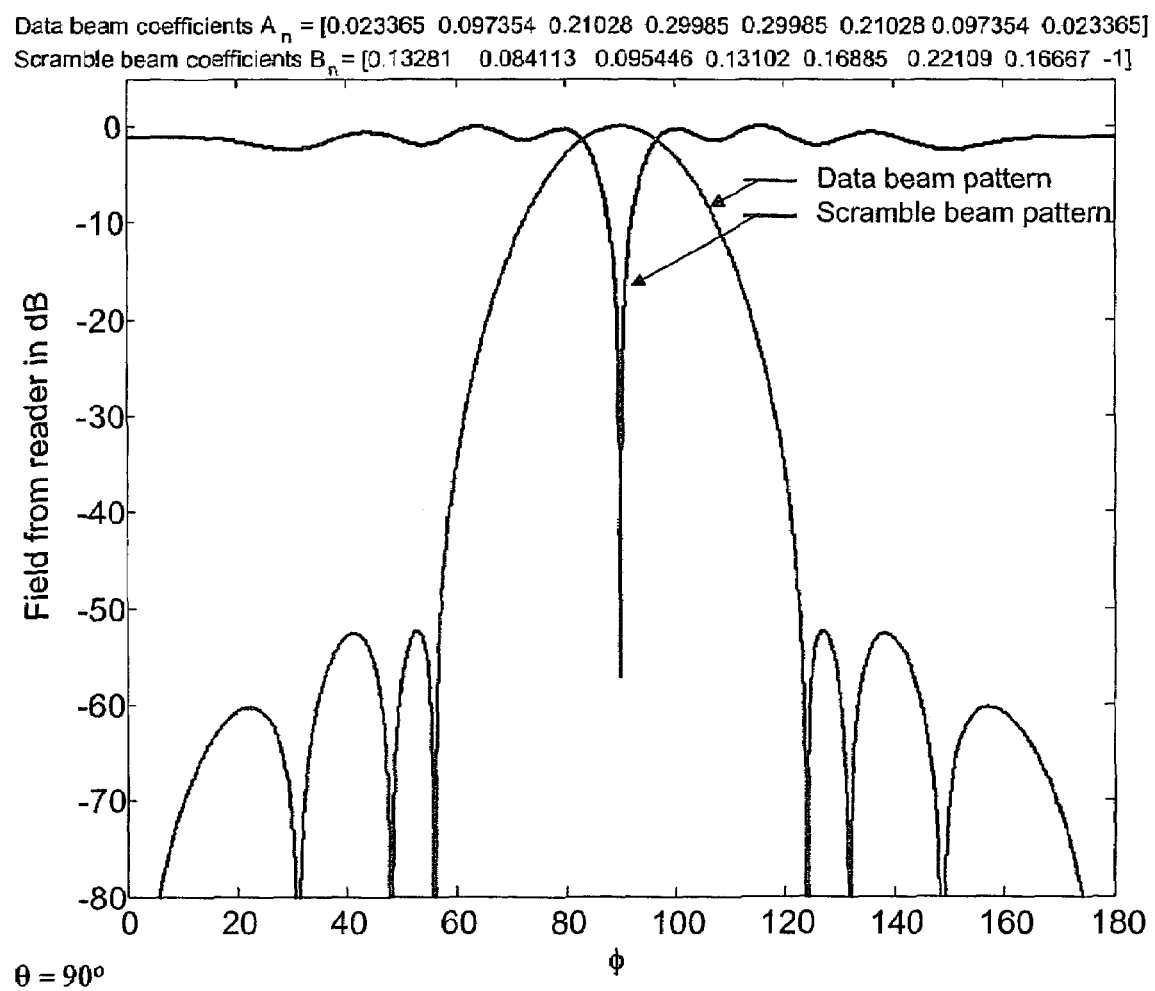
FIG. 18 illustrates another set of data and scramble beams of the array in FIG. 16 evaluated at θ=90°. The array elements are z-directed dipoles and both sets of excitation coefficients are shown above the plot.

FIG. 18 shows a scramble beam that has all its zeros, except the central one, located on a circle in the complex plane of radius 1.46. This scramble beam has an almost constant amplitude away from the central zero at $\phi=90°$. Hence, it is well suited for charging and communicating with any tag located away from $\phi=90°$. The excitation coefficients are given above the figure. All the excitation coefficients for the scramble beam in FIG. 18 are positive except the last one, which equals −1. The sum of these coefficients equals zero.

The array used in this section operates at 2.4 GHz. The method for creating a reader with omni-directional power pattern works for any frequency that results in electromagnetic wave propagation, and in particular for the popular RFID frequencies around 900 MHz. Instead of using the Shelkunoff unit circle representation to achieve the constant-level scramble signal, one can use the iterative array-synthesis methods discussed above and in [2] with appropriate cost functions. The iterative methods can be used directly to achieve constant-level scramble beams for ring arrays and planar arrays.

Scanning Array Readers that Employ Triangulation

This section describes the method of the present invention for determining the precise location of tags. The method may be explained with reference to FIG. 19 where the tags are located inside a room with two array readers placed on the walls. The array readers transmit narrow signal beams surrounded by scramble beams as described above. The beams are scanned using standard beam steering.

In one embodiment, the data signal simply causes a tag to transmit its tag identification number. In a more advanced embodiment, the data signal contains the current scan angle and a reader identification number, and the tags respond by re-transmitting that scan angle and reader identification number along with a tag identification number. If two or more tags are present in the region of the data signal at any given scan angle, prior art anti-collision methods are employed [1, Chapter 7]. The tag transmissions can be recorded by the readers or by other receivers.

Figure 19:
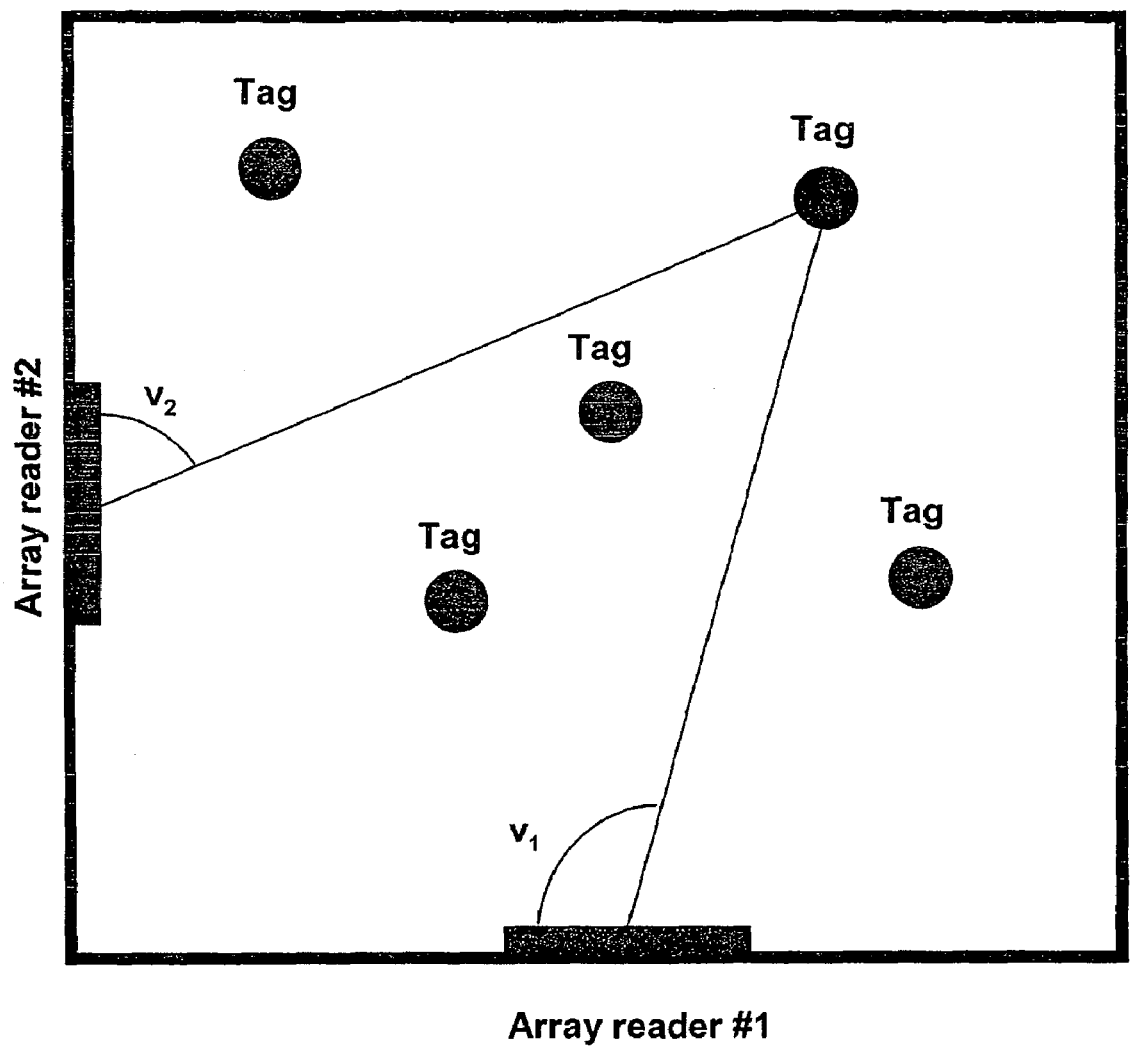
FIG. 19 illustrates a scanning-array positioning system that employs two array-antenna readers.

Hence, after the two array readers have completed a scan, a table is populated with a field for each tag that contains the scan angles for which the tag received a signal beam from each of the two readers. A tag typically receives the data signal from a reader at more than one scan angle since the scan-angle increments are smaller than the width of the data-signal beam. For location purposes, one can average the angles to obtain a table for each tag that contains one scan angle for each reader. This procedure is illustrated in FIG. 19 where the scan angles for one of the tags are $v_1$ and $v_2$. The location of the tag is easily determined from these two angles and the positions of the readers.

To determine the position of tags located directly in the line-of-sight between array reader #1 and array reader #2 requires an additional array reader. For many applications, however, it is possible to place array reader #1 and array reader #2 such that no tag can be located directly between the readers, and all tag positions can be determined with array reader #1 and array reader #2.

The optimal positions for the readers depend on the spatial distribution of the tags and on possible obstacles that can interfere with the transmissions. For some indoor applications, it is advantageous to hang from the ceiling ring-array readers that each can scan 360 degrees. The position of a tag could be determined from the transmission of two ring-array readers, provided the tag is not directly between those readers. A combination of ring-array, planar-array, and linear-array readers may be optimal in complicated scenarios.

In the example above, the readers are stationary and the tags are allowed to move around. In certain applications, it is advantageous to permit the readers to move as well. For example, one can record the position of the inventory of a large warehouse with one or more readers that move around, provided the location and orientation of the readers are known at all times.

A reader can be any type of active transceiver with a narrow signal beam, including planar array antennas that have pencil-like signal beams suitable for 3D location. A tag can be any type of passive or active transceiver that can be placed on an object whose precise location is sought. Such tag-reader systems can replace laser and GPS positioning systems in certain applications.

For example, if a tag is placed on a moving vehicle and readers continuously scan as described above, the tag can continuously transmit the positions of the vehicle to any receiver within range. Another application of such precision tag-reader systems is land surveying, where the locations in 3D are sought for surface features in the area of interest. Yet another application is remote sensing where the position of receivers must be known precisely.

The present invention also provides a method for determining the position of a vehicle in an area where multiple tags are placed at known locations on stationary objects such as walls. An RFID reader mounted on the vehicle can determine the position of the vehicle by recording the angles of at least two tags using triangulation.

Inductive RFID Systems

Inductive RFID systems operate at frequencies below 50 MHz, where the wavelength is much longer than the physical dimensions involved, and the reader and tags are inductively coupled. Precise tag location and user-defined interrogation regions can be achieved with inductive RFID systems as described below.

Figure 20:
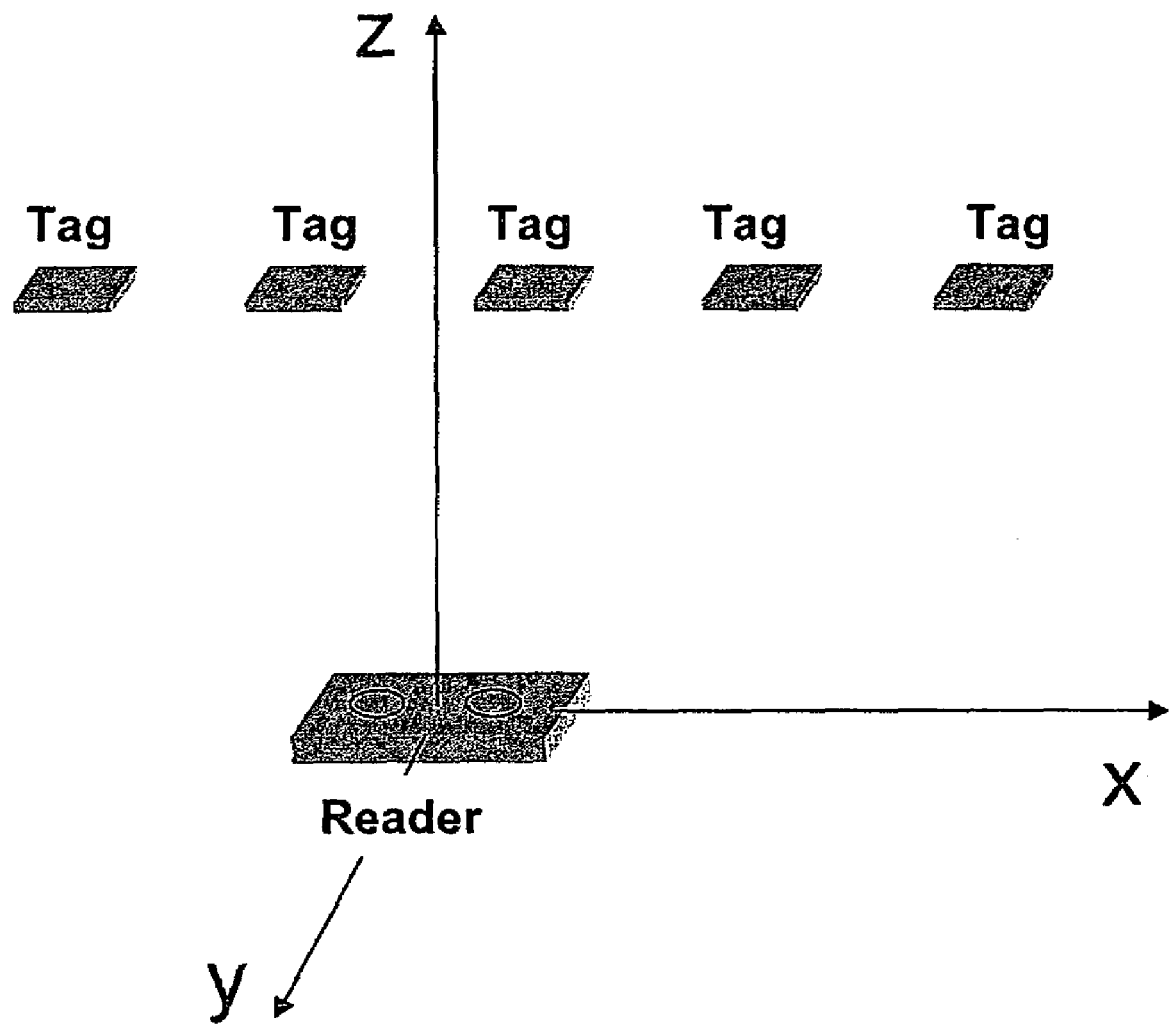
FIG. 20 illustrates an inductive RFID reader employing two loops parallel to the x-y plane.

Consider the tag-reader system in FIG. 20 where the reader is at the origin and the tags are placed on a line parallel to the x axis given by z=30 cm, y=0. The tag antennas are loops parallel to the x-y plane, so the tags respond only to z-directed magnetic fields.

The reader employs two small loops that lie in the x-y plane with their center points 10 cm apart. The spatial dependence of the magnetic fields emitted by such loops can be approximated well by the spatial dependence of the magnetic fields of z-directed static magnetic dipoles, as described in the reference "Plane-wave theory of time-domain fields" by T. B. Hansen and A. D. Yaghjian, IEEE Press, 1999.

The loops of the reader each transmit two signals, so that the total signal transmitted by loop #p is $$T_p(t)=A_p a(t)+B_p b(t)$$

where a(t) is the data signal and b(t) is a scramble signal. $A_p$ and $B_p$ (p=1, 2, ..., N) are the excitation coefficients for the data and scramble signals, respectively. FIG. 20 shows an inductive RFID reader employing two loops parallel to the x-y plane. The center points of the loops are on the x axis at x=−5 cm and x=5 cm. The tags are located along the line z=30 cm, y=0 and respond to z-directed magnetic fields. For the reader shown in FIG. 20, the coefficients are set as follows:

$A_1=1$ $B_1=5$ $A_2=1$ $B_2=−5$.

Figure 21:
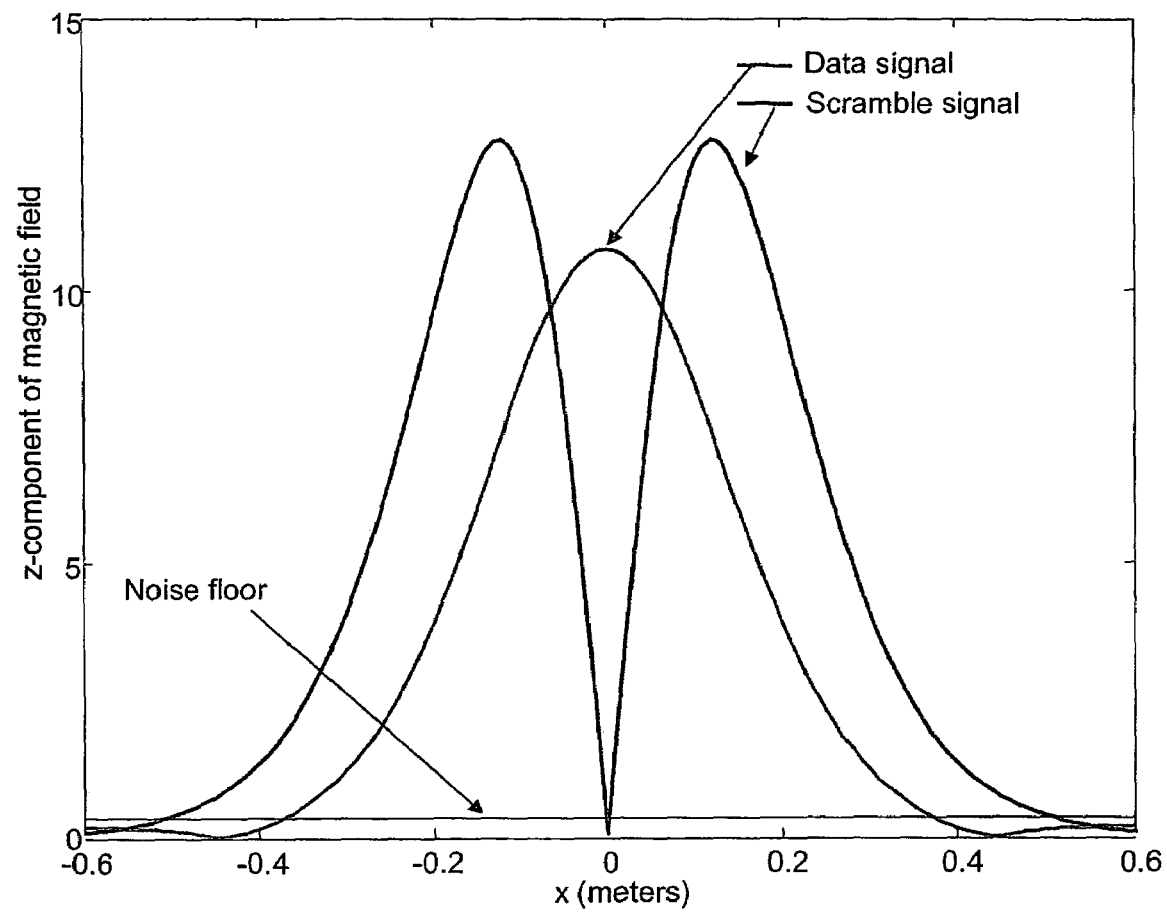
FIG. 21 illustrates the magnitudes of the z-components of the magnetic fields for the data and scramble signals transmitted by the inductive reader in FIG. 20.

FIG. 21 shows the magnitudes of the z-components of the resulting magnetic fields at the tag locations obtained from the magnetic dipole approximation. Also shown in FIG. 21 is the noise floor that determines the minimum signal strength required to interrogate a tag. If the scramble signal is turned off, all tags within a 75 cm region respond to the reader (75 cm is approximately the interrogation width obtained with a reader that employs only a single loop antenna). With the scramble signal turned on, only tags within a 10 cm region respond to the reader, thereby allowing the precise location of individual tags and reducing tag collisions. The scramble signal can charge and prepare the tags for interrogation in a scenario where the reader scans along a line.

This example involving a reader that employs two loops demonstrates the use of data and scramble signals in inductive RFID systems. Optimization methods can be employed by those skilled in the art of coil design to obtain loop configurations for which the magnetic field of the data signal is overshadowed by the magnetic field of the scramble signal except in selected regions. See, for example, U.S. Pat. Nos. 5,157,605 and 6,557,794 and the references therein. Thus, one obtains inductive readers with user-specified interrogation zones.

RFID Security

According to [1, Chapter 8], high-security RFID systems should have defense mechanisms against the following three types of attacks: (1) Unauthorized reading of a data carrier in order to duplicate and/or modify data. (2) The placing of a foreign data carrier within the interrogation zone of a reader with the intention of gaining access to a building or receiving services without payment. (3) Eavesdropping into radio communications and replaying the data in order to imitate a genuine data carrier ("replay and fraud").

As with other types of wireless communication systems, RFID systems currently use authentication and encryption methods to defend against these attacks. These defense methods have certain inherent weaknesses as described in [2] and [3]. Additional security measures can be obtained by using the secure transmission and reception techniques described in [2] and [3]. These techniques work for any wireless communication system, including systems that operate in the inductive regime as demonstrated above.

The scramble signals can prevent an eavesdropper located outside the interrogation zone from gaining access to the data stream that is broadcast by the RFID reader. Highly directive antennas can be employed to prevent eavesdropping and unauthorized access to the network. Nulls can be placed in the receiving pattern of the reader to prevent unauthorized access to the network.

Method for Optically Displaying Interrogation Zones

This section describes a method for optically displaying the interrogation zone of an RFID reader. The reader interrogates only tags located in the interrogation zone.

Figure 22:
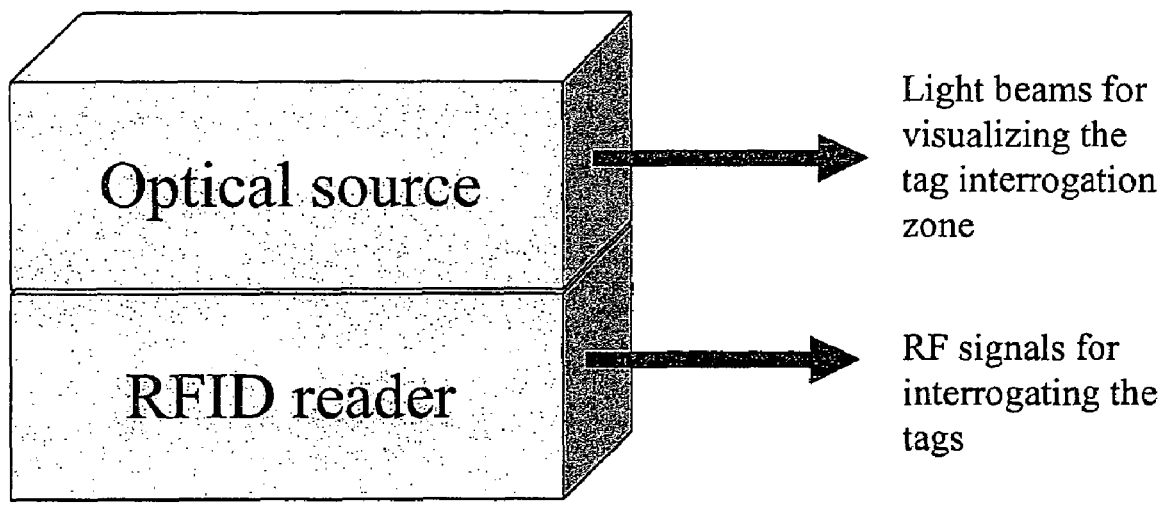
FIG. 22 illustrates an RFID tag reader with an optical source attached to its housing.

An optical source attached to the RFID reader, as shown in FIG. 22, sends out one or more light beams that visualize the interrogation zone. For hand-held readers, the optical source can be a small laser pointer that transmits a beam in the direction of the center of the interrogation zone. With this embodiment, the user will see a laser dot on an object that is located in the center of the interrogation zone. Hence, the reader can be pointed precisely toward a selected object. With more than one laser pointer, the boundaries of the interrogation zone can be displayed, as illustrated in the following example.

Figure 23:
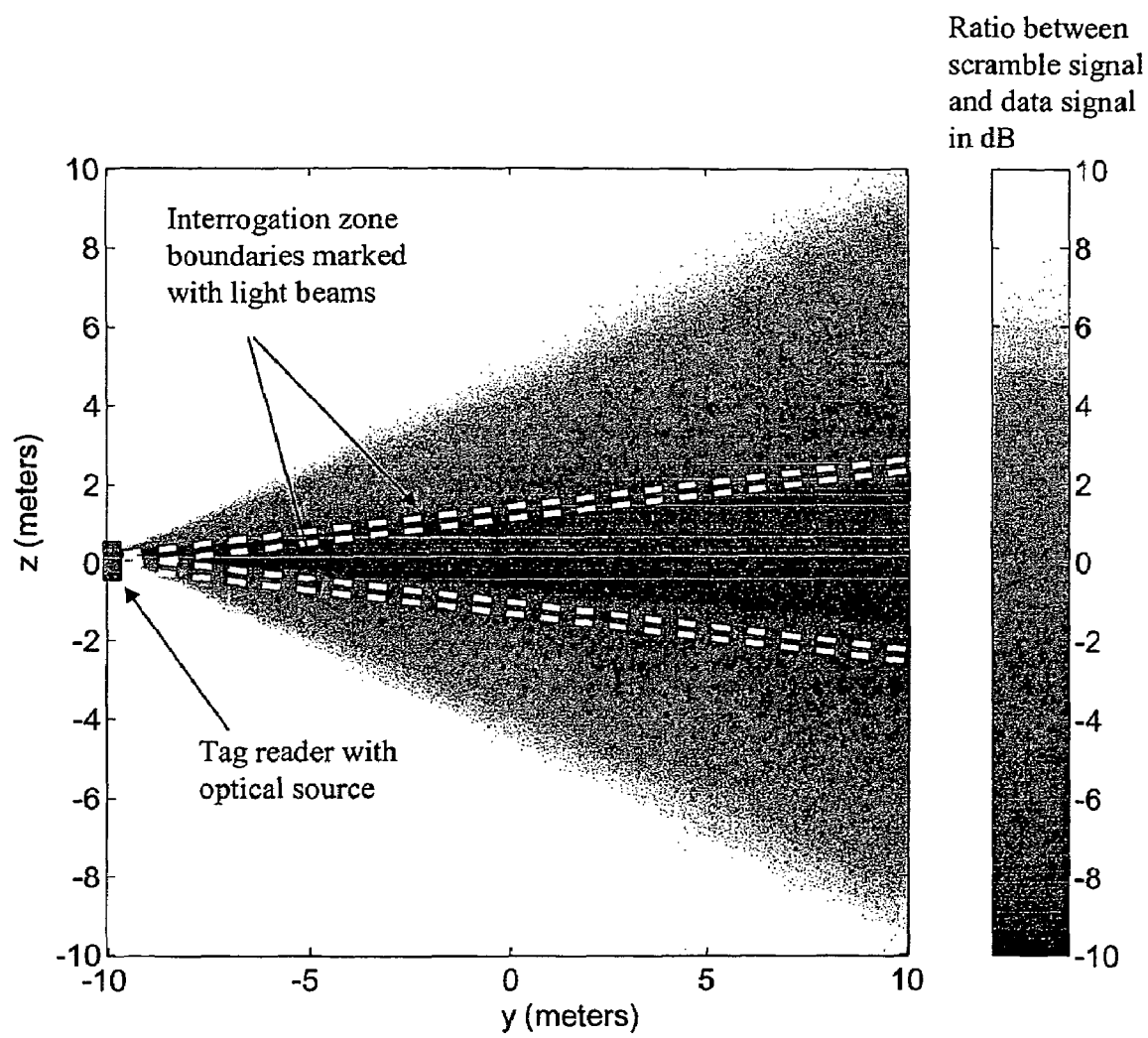
FIG. 23 illustrates the ratio of the scramble signal and data signals for a four-element array reader operating around 900 MHz. The data signal dominates in the black shaded zone. The two light beams mark the boundaries of the interrogation zone.

FIG. 23 shows an optical source that sends out two light beams and is attached to a four-element hand-held tag reader that operates at frequencies around 900 MHz. The element spacing is 10 cm and the total array length is 30 cm. This type of tag reader is described in [4]. FIG. 23 shows the ratio in dB of the scramble signal and the data signal in a 20 meter by 20 meter region of space, color coded with a gray scale color map. The data beam dominates in the shaded region, which therefore is the interrogation zone for the reader.

The optical source transmits two light beams that coincide with the boundaries of the interrogation zone, as shown in FIG. 23 and described in [5]. In one embodiment, the two light beams are generated by two laser pointers that produce red dots on objects that are at the edges of the interrogation zone. Thus, the user can see which objects are in the interrogation zone.

Multiple readers that work together can be used with triangulation to determine the absolute location of tags, as described above and in [4]. If optical sources are attached to each reader, the intersection of light beams shows the absolute position of tags.

A Two Element Reader

Figure 24:
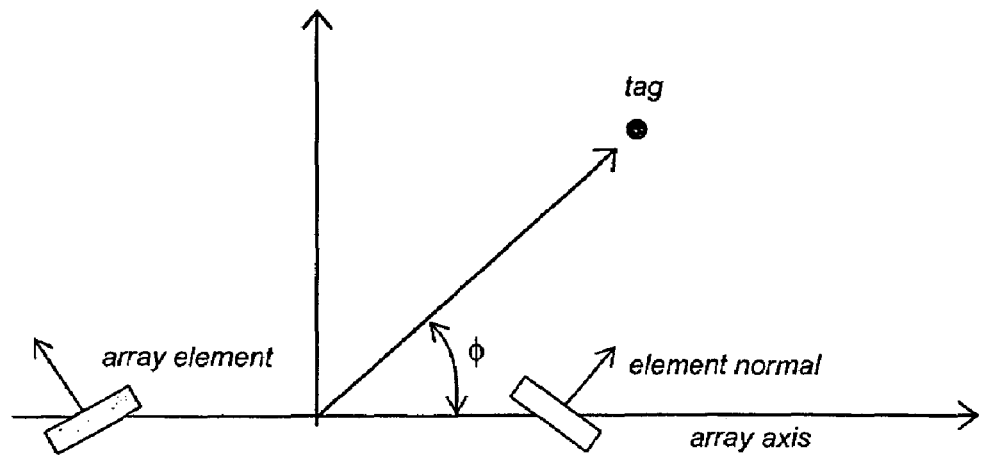
FIG. 24 illustrates the geometry for an array of two antenna elements that can be tilted independently with respect to the array axis.
Figure 25:
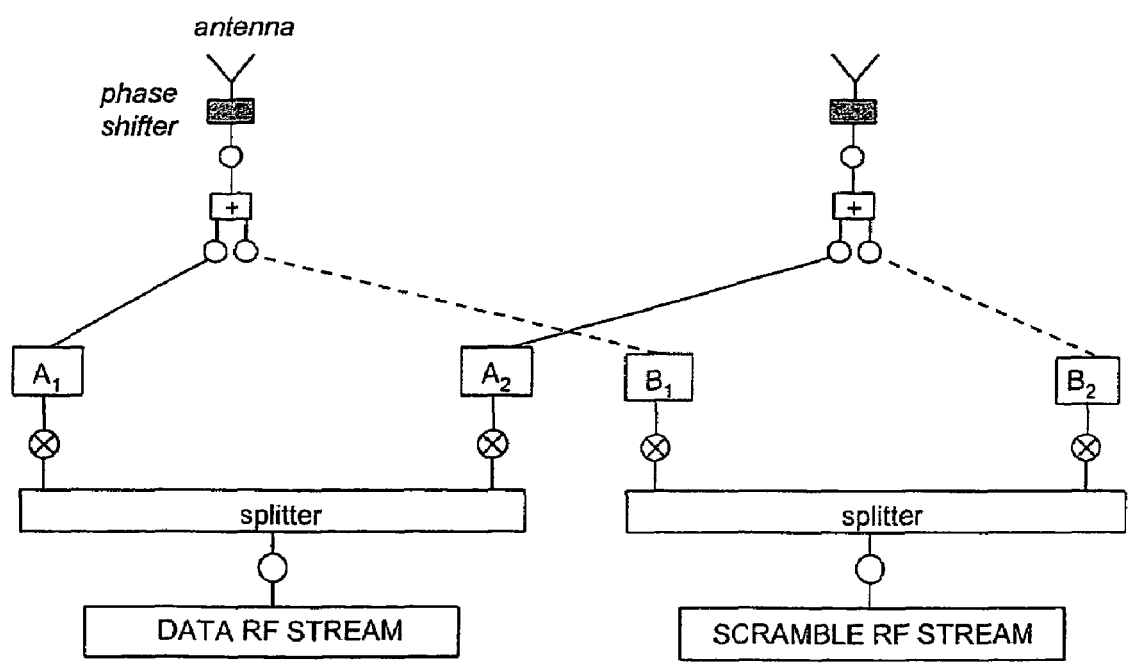
FIG. 25 illustrates a schematic of RF control electronics for a two-element array. Each antenna element is driven by a linear combination of two RF signals: a data signal and a scramble signal. The beam patterns for each signal are determined by the weighting coefficients (in boxes); phase shifts (time delays) can be used to steer the total beam pattern in a specific direction.

FIG. 24 shows a compact RFID reader design that employs a two-element antenna array, as described in [6]. The antenna elements can be of any type suitable for broadcasting at the RFID frequencies. The array elements can be tilted independently with respect to the array axis. FIG. 25 shows the schematic of RF control electronics for the two-element array. Each antenna element is driven by a linear combination of two RF signals: a data and a scramble signal. The beam patterns for each signal are determined by the weighting coefficients $A_1, A_2, B_1$, and $B_2$. Phase shifts (time delays) can be used to steer the beam patterns in a specific direction. To achieve a difference pattern for the scramble signal, one can set $B_1 = -B_2$.

Figure 26:
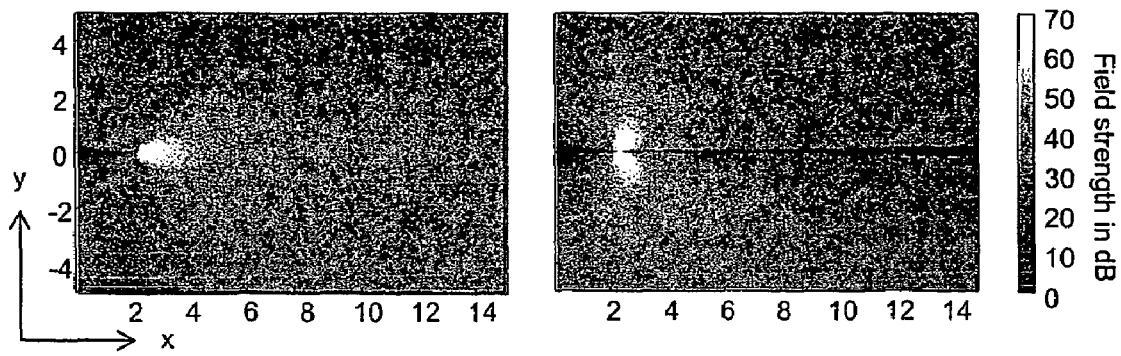
FIG. 26 illustrates free-space signal strength of data beam (Left) and scramble beam (Right). Axis units are meters.

FIG. 26 shows the free-space field distributions in the x-y plane when the array elements are patch antennas with $(1+\cos(v))$ patterns, where v is the angle between the element normal and the observation point in the x-y plane, displaying the strength of the data beam (Left) and the scramble beam (Right). (See R. J. Mailloux, "Phased Array Antenna Handbook," Artech House, 1994, Chapter 4.) The elements are located at (x, y, z)=(2 m, 8.3 cm, 0) and (x, y, z)=(2 m, −8.3 cm, 0), with element normals pointing in the x direction. The antennas operate at 900 MHz with weighting coefficients $A_1=A_2=B_1=-B_2=1$. All time delays are zero so the beams point in the broadside direction.

Figure 27:
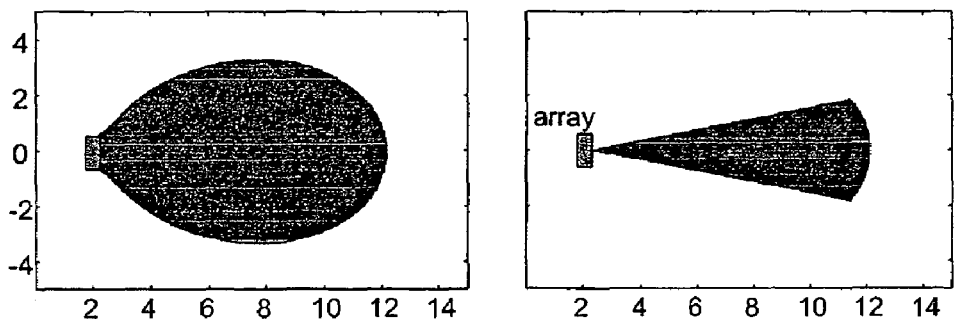
FIG. 27 illustrates interrogation zones of data beam (Left) and of combined data and scramble beams (Right).

The sum pattern carries the data signal and the difference pattern carries the scramble signal. The data signal (FIG. 26 Left) has its peak in the broadside direction where the scramble signal (FIG. 26 Right) has its null. Assume that the power level of the data signal is adjusted so that tags in the broadside direction at a distance of 10 m receive just enough power to function, and that the modulated scattering from these tags can be correctly understood by the reader. The plot on the left in FIG. 27 shows the tag interrogation zone achieved with a reader that broadcasts only the data signal. All tags at the edge of the interrogation zone receive just enough power to function. Tags outside the interrogation zone do not receive enough power. The right plot in FIG. 27 shows the interrogation zone obtained when the reader broadcasts both data and scramble signals. For a tag to function in this mode of operation, it must be in a location where two conditions are met: (1) the power of the data signal is sufficient to set off a tag and (2) the data signal overshadows the scramble signal (the data signal is at least 10 dB larger than the scramble signal in the dark shaded area of the right plot in FIG. 27; this 10 dB threshold is an arbitrary figure chosen for illustration purposes only, the actual threshold will depend on the particular system being used). The interrogation zone obtained with information steering is much narrower than the interrogation zone achieved with a standard broadcast scheme. Moreover, the angular extent of the interrogation zone is independent of the power levels of the signals, provided the ratio of the scramble signal power and data signal power is kept constant. For example, the interrogation zone in the right plot of FIG. 27 is achieved with $A_1=A_2=B_1=-B_2=1$. The same angular interrogation width can be obtained with $A_1=A_2=B_1=-B_2=0.5$ (since less power is transmitted, however, the interrogation range is reduced).

The angular extent of the interrogation zone can be adjusted by changing the ratio of the scramble signal power and data signal power. For example, $A_1=A_2=1$ and $B_1=-B_2=0.5$ would produce an interrogation zone that is wider than the one in the right plot of FIG. 27. The array excitation coefficients for the data and scramble signals can thus be adjusted to create an interrogation beam that precisely fits an opening of a container.

Figure 28:
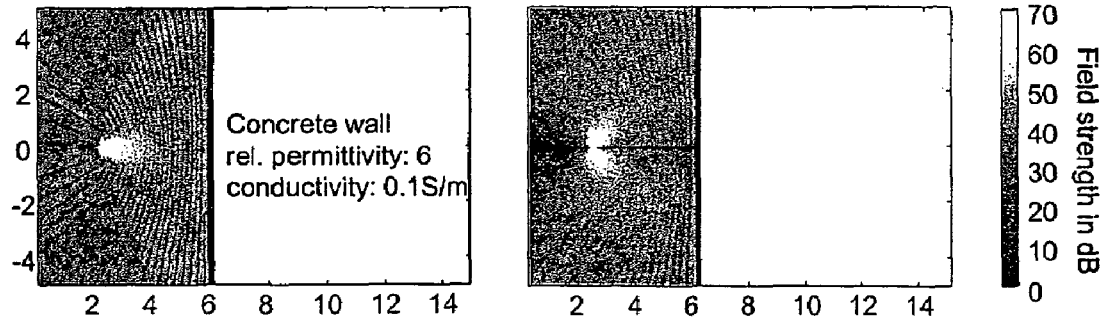
FIG. 28 illustrates total signal strength of the data beam (Left) and the scramble beam (Right) when the beams are broadcast toward a concrete wall.
Figure 29:
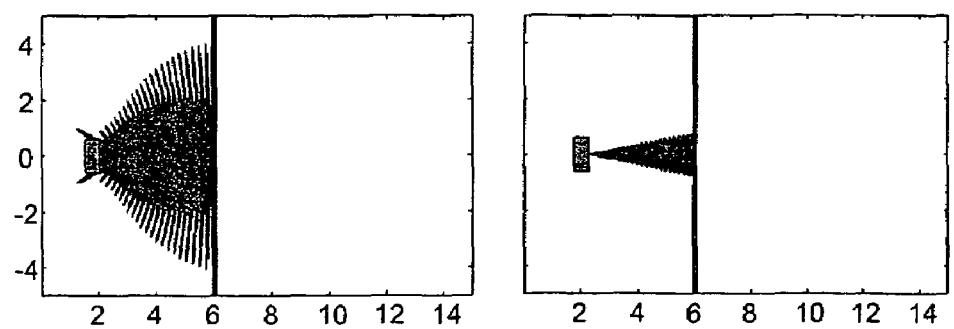
FIG. 29 illustrates interrogation zones of data beam (Left) and of combined data and scramble beams (Right) when the reader broadcasts toward a concrete wall.

A concrete wall is now placed 4 m from the reader. FIG. 28 shows the total field distributions (direct field plus reflected field) for the data and scramble signals. More specifically, FIG. 28 shows the total signal strength of the data beam (Left) and the scramble beam (Right) when the beams are broadcast toward a concrete wall. The field distributions have ripples (peaks and nulls) that result from the direct and reflected fields being in and out of phase. Close to the reader, however, the direct field dominates. FIG. 29 shows the interrogation zones based on the same value for the required power level that was used in FIG. 27. The interrogation zone of the data signal alone (FIG. 29 Left) has widened because the reflected field from the wall can set off additional tags. The interrogation zone achieved by broadcasting both data and scramble signals (FIG. 29 Right) is much narrower and the power of the reflected scramble signal prevents additional tags from being set off. This example illustrates that the two-element reader can work in a multipath environment.

A Three-Element Reader

A standard commercially available reader can be augmented to achieve a narrow well-defined interrogation zone. The standard reader employs one antenna that broadcasts a single interrogation beam. From the discussion that follows, it is straightforward to augment standard readers that employ multiple antennas.

Figure 30:
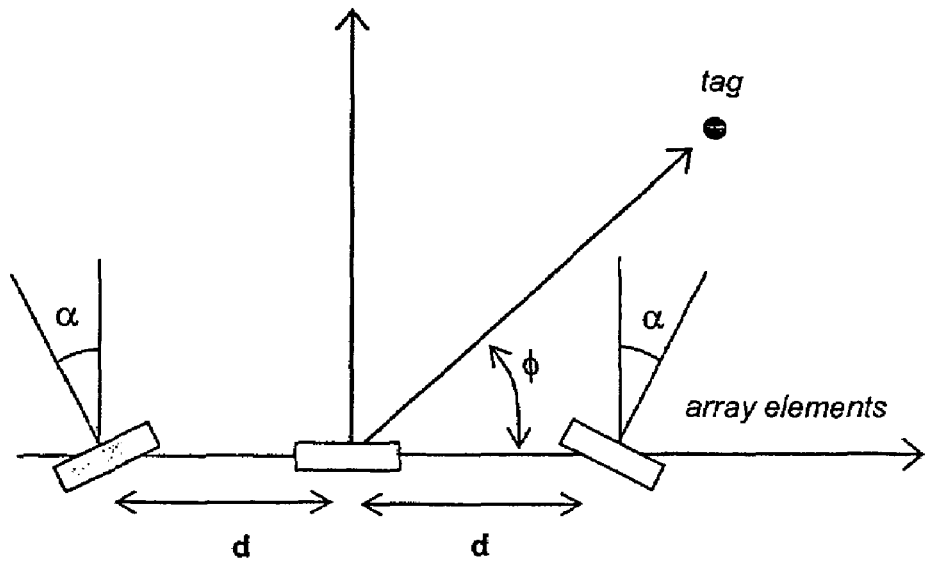
FIG. 30 illustrates geometry for an array of three identical patch antennas. The middle antenna broadcasts the data signal. The outer antennas broadcast scramble signals. The two outer elements are tilted by the angle α.
Figure 31:
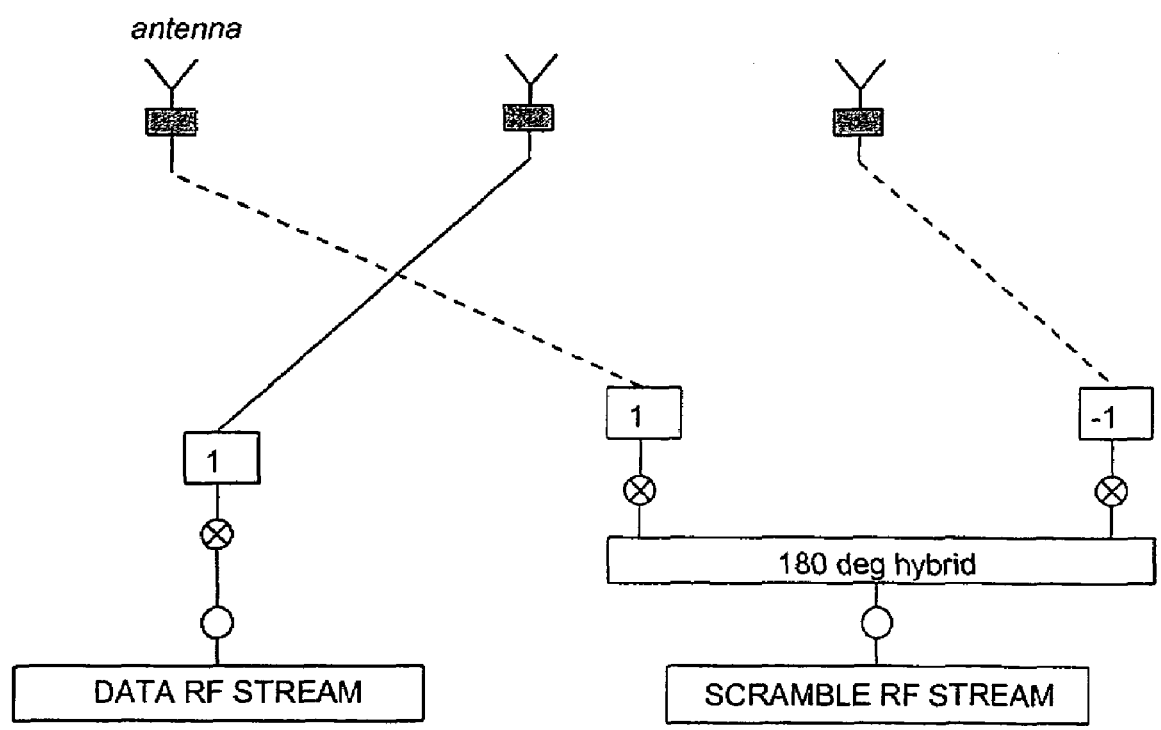
FIG. 31 illustrates a schematic of RF control electronics for a three-element array. The middle antenna element is driven by the data signal. The two outer elements are driven by the scramble signal. The beam patterns for each signal are determined by the weighting coefficients (in boxes).

FIG. 30 shows the antenna array consisting of the antenna of the standard reader in the middle surrounded by two scramble-signal antennas, where the array comprises three identical patch antennas. The middle antenna broadcasts the data signal. The outer antennas broadcast scramble signals. The two outer elements are tilted by the angle α. The signals fed to the scramble antennas are 180° out of phase and generated by a scramble signal generator as shown in FIG. 31. The signal fed to the middle antenna is simply the signal from the standard reader, which need not be modified. The two outer elements are driven by the scramble signal. As indicated in FIG. 30, the antenna elements can be tilted to achieve the desired interrogation zone as described in [2]. The beam patterns for each signal are determined by the weighting coefficients, as shown in the boxes in FIG. 31.

Figure 32:
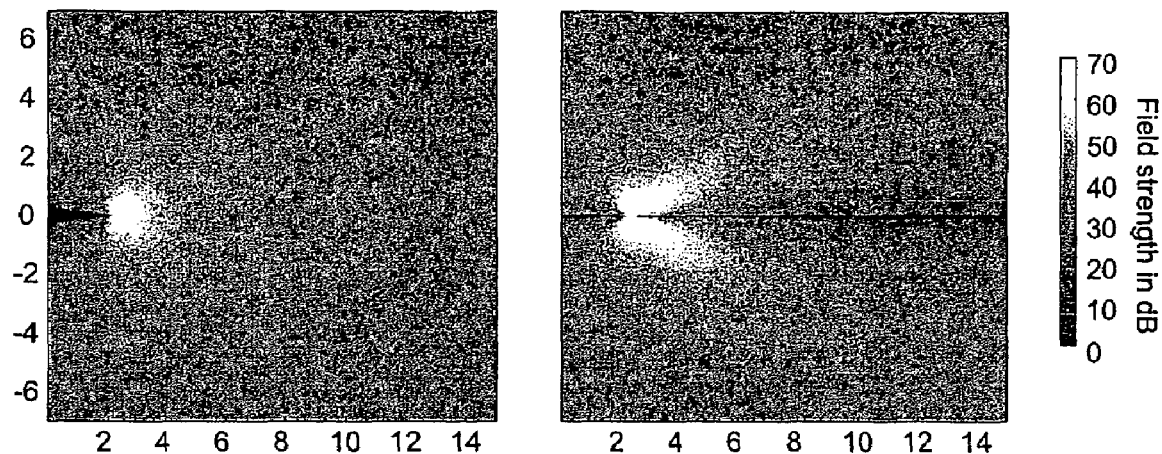
FIG. 32 illustrates free-space signal strength of data beam (Left) and scramble beam (Right). Axis units are meters. The distance between array elements is d=17 cm, and the tilt angle is α=30°.
Figure 33:
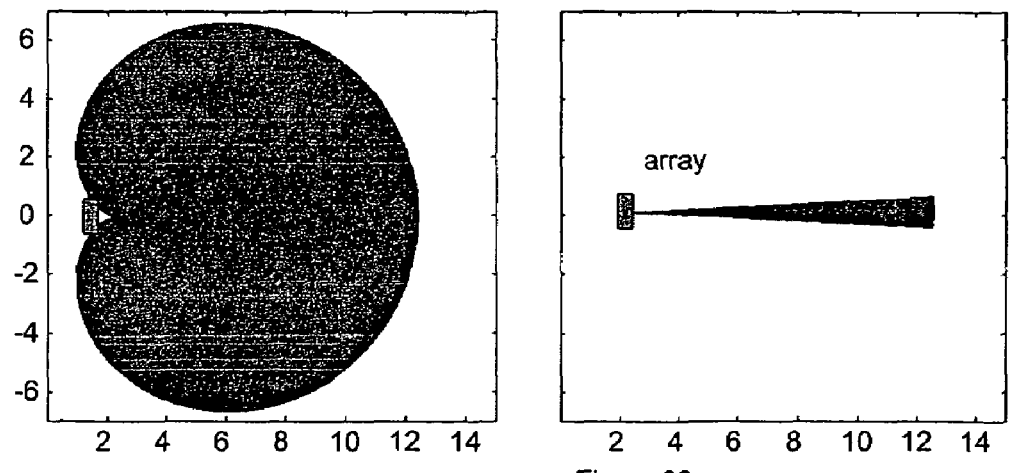
FIG. 33 illustrates interrogation zones of data beam (Left) and of combined data and scramble beams (Right).

Consider a special design where the three elements are the 900 MHz patch antennas used above in the two-element reader. The element distance is chosen to be 17 cm, and the scramble signal antennas are tilted by the angle α=30° as indicated in FIG. 30. FIG. 32 shows the resulting field distribution of the data beam (Left) and scramble beam (Right). FIG. 33 shows the interrogation zones (assuming that the power level is adjusted to achieve a 10 m range) for the standard reader that broadcasts only a data signal (Left) and for the augmented reader in FIG. 31 that broadcasts both scramble and data beams (Right). The augmented reader has a much narrower interrogation zone.

The design in FIG. 31 does not require data and scramble signals to be mixed since each antenna element transmits only a data or a scramble signal. This design can therefore be a cost-effective embodiment of a reader that operates in accordance with the principles of [2].

Using Multiple Sets of Excitation Coefficients to Overcome Multipath Effects

In indoor environments, signals bounce off walls and other objects, so the field at a given observation point is the sum of signals that have traveled through different paths. In some areas the multipath field components can sum to produce a total field that is too weak to communicate with a tag. Further, one must consider areas of low field strength in the scramble signal, which cause the data signal to "leak" out into unintended regions.

Figure 34:
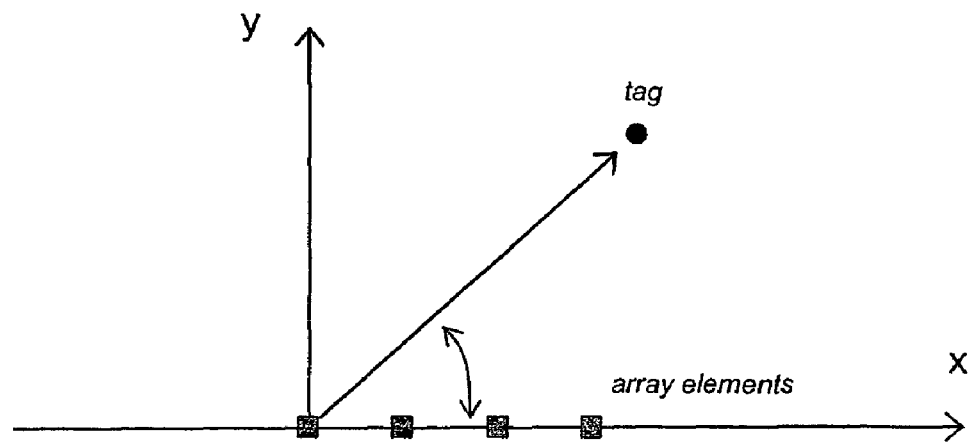
FIG. 34 illustrates the geometry for an array of four identical antenna elements.
Figure 35:
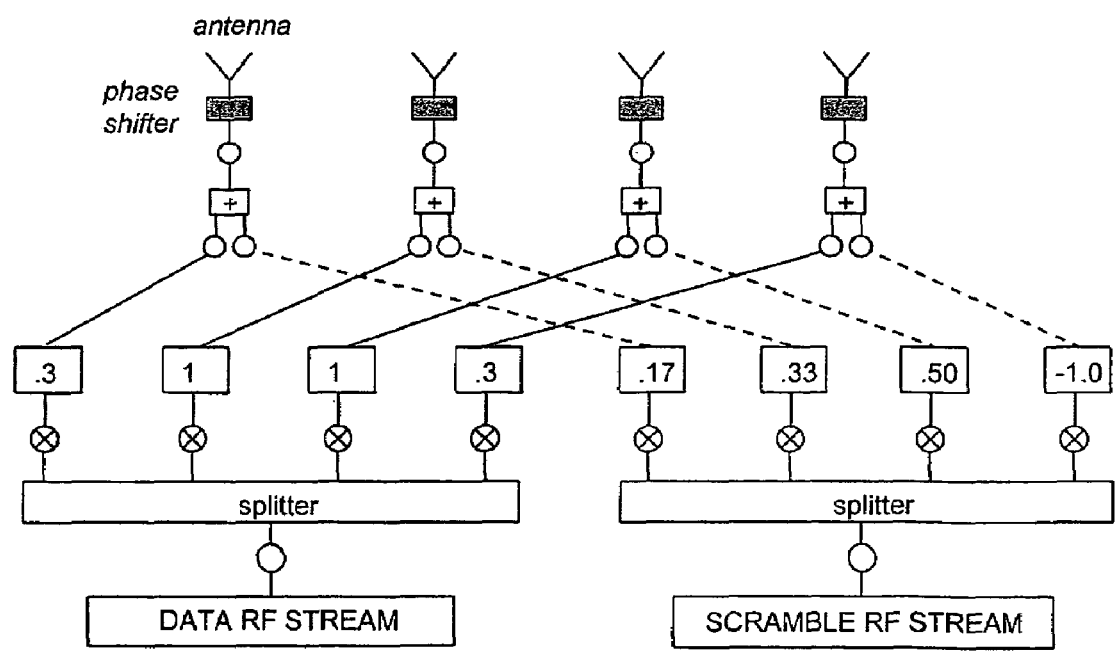
FIG. 35 illustrates a schematic of RF control electronics for a four-element array. Each antenna element is driven by a linear combination of two RF signals: a data signal and a scramble signal. The beam patterns for each signal are determined by the weighting coefficients (in boxes); phase shifts (time delays) can be used to steer the total beam pattern in a specific direction.
Figure 36:
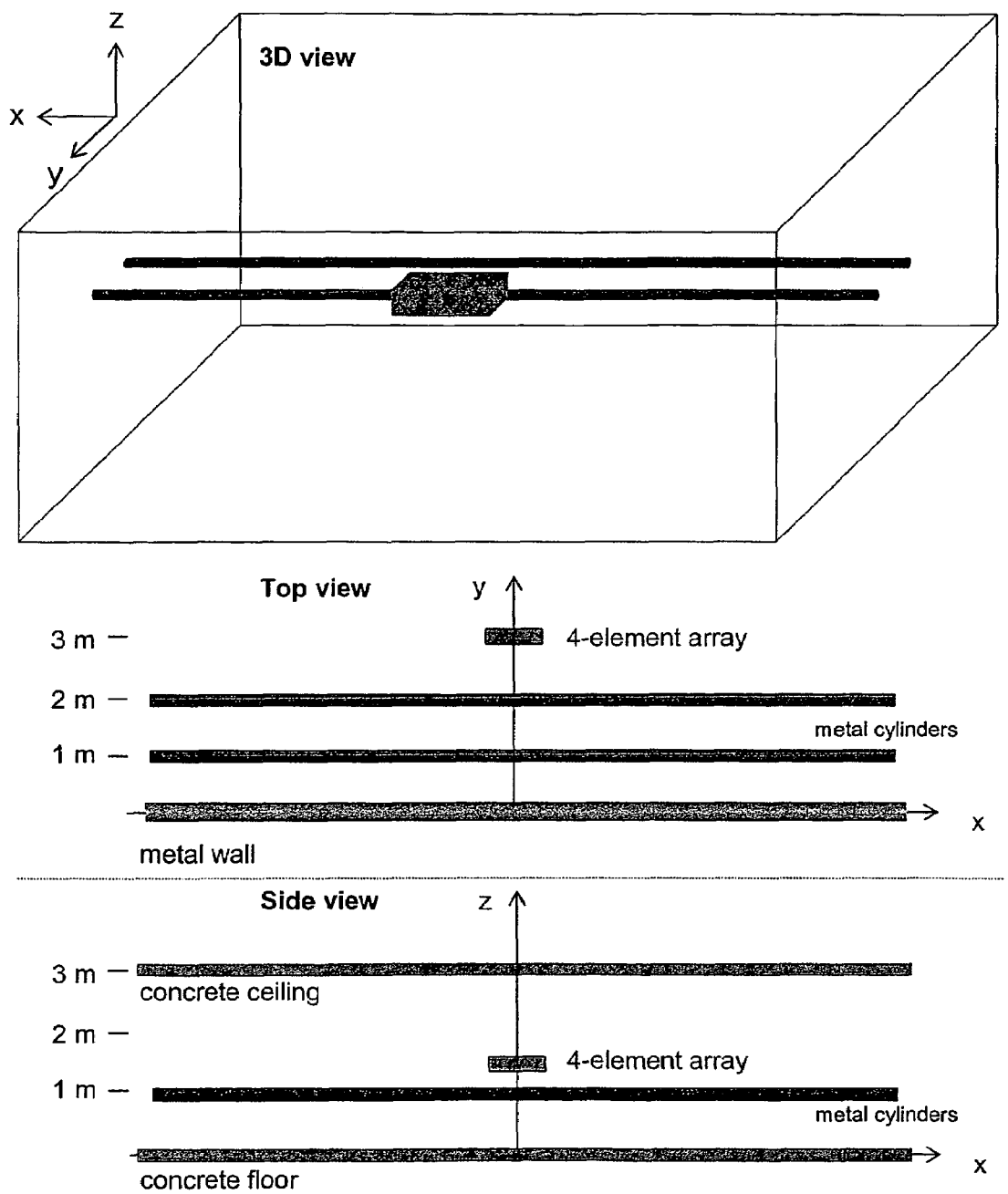
FIG. 36 illustrates the geometry of a 3D model of an RF tag reader (array), operating in front of a conveyor belt in a room with a metal wall and concrete floor and ceiling.
Figure 37:
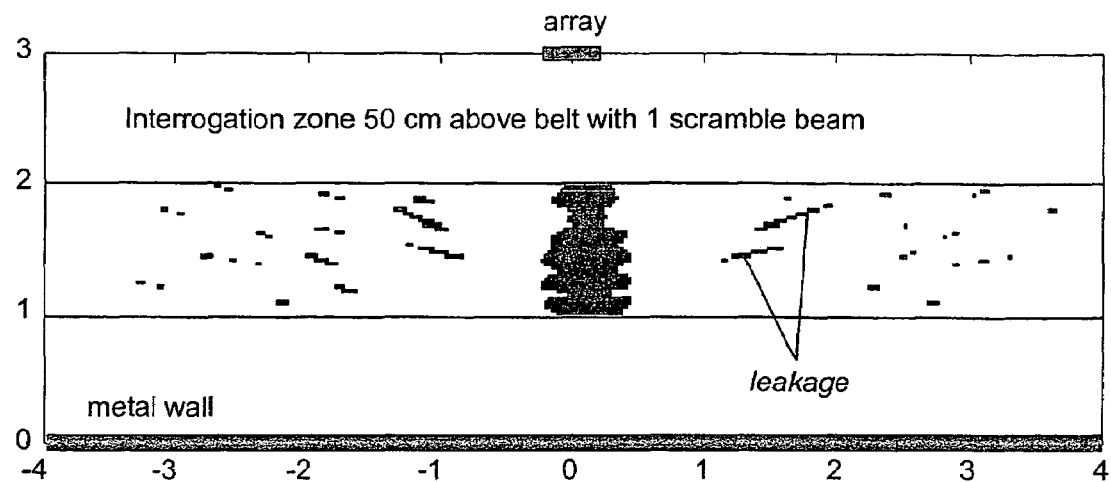
FIG. 37 illustrates interrogation zones above the conveyor belt where the data signal is more than 10 dB greater than the scramble. The top plot shows the interrogation zone for a simple superposition of one data beam and one scramble beam. Because of multi-path effects, the scramble beam has nulls that cause leakage of the data signal into undesired regions. The bottom plot shows the results of a more sophisticated scheme that uses two scramble beams to eliminate leakage.
Figure 37:
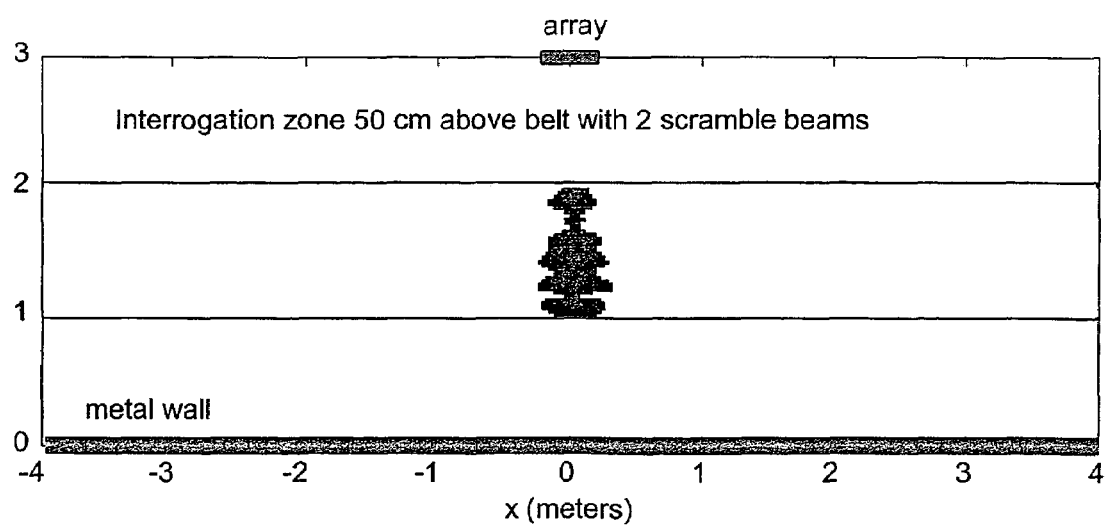

FIG. 34 shows a reader that consists of four x-directed dipole antennas that operate at 900 MHz with the excitation coefficients in FIG. 35. FIG. 35 shows a schematic of RF control electronics for the four-element array shown in FIG. 34. Each antenna element is driven by a linear combination of two RF signals: a data signal and a scramble signal. The beam patterns for each signal are determined by the weighting coefficients (in boxes). Phase shifts (time delays) can be used to steer the total beam pattern in a specific direction. To interrogate tags that are placed on items that move on a conveyer belt, the reader broadcasts toward a metal wall 3 m away as shown in FIG. 36. The frame of the conveyer belt is modeled as metal cylinders with a thin-wire approximation. Floor and ceiling are made of concrete. The field distribution is computed with a geometrical optics model that includes single bounces off the metal wall, floor, ceiling, and cylinders. FIG. 37 (Top) shows the interrogation zones for a simple superposition of one data beam and one scramble beam 50 cm above the conveyer belt where the data signal is at least 10 dB greater than the scramble. The data signal leaks out in several locations as indicated because multipath effects produce areas where the scramble signal is too weak.

This leakage can be eliminated by a modification of the broadcast scheme, which uses complementary scramble signals broadcast from the same array and creates the narrow interrogation zone shown in the bottom plot of FIG. 37. This new scheme operates as follows: Two complementary scramble patterns are created, for example, using the set of scramble array coefficients in FIG. 35 and its mirror image. These two scramble patterns can be broadcast simultaneously using two different scramble signals and additional mixing elements in the control electronics. Alternatively, the two signals can be broadcast sequentially during the same interrogation cycle. The bottom plot of FIG. 37 illustrates how narrow interrogation zones can be achieved even in severe multipath environments with the additional scramble signal.

The data signals can also be affected by multipath making it impossible to interrogate tags at certain locations. This problem can in some cases be overcome by broadcasting the data signal with multiple sets of excitation coefficients. To avoid interference, the various data beams should be broadcast sequentially.

These examples serve to illustrate a general method for reducing the effect of multipath: broadcast multiple beams with the same purpose (either data or scramble beams) by applying different sets of excitation coefficients to the array. For non-symmetric excitations coefficients (such as the scramble beam coefficients in FIG. 35), one can employ sets of excitation coefficients that are mirror images of each other. Sets of excitation coefficients that steer the beams in slightly different directions can also help overcome multipath effects.

Optimal sets of excitation coefficients can be determined from modeling and/or on-site measurements with the following procedure: (1) Set all excitation coefficients equal to zero except the excitation coefficient for the first array element, which is set equal to one. (2) Compute or measure the one-element field distribution over the desired interrogation zones. (3) Repeat this procedure for all other array elements to obtain N sets of one-element field distributions for an array with N elements. (4) Use linear combinations of the one-element field distributions to compute the total field distribution when the array is driven by a particular set of excitation coefficients. (5) Select sets of excitation coefficients so that the combined beams result in correct interrogation of tags placed at arbitrary locations in the interrogation zone.

Step (5) of the procedure can be achieved as follows: Start with a first set of excitation coefficients that would work for free space. Determine the locations in the interrogation zones where the corresponding field distribution is too weak when the reader operates in the multipath environment of interest. Determine a second set of excitation coefficients by modifying the first set of excitation coefficients, which creates a field distribution that fills out the areas where the field distribution of the first set of excitation coefficients is too weak. The modification of the first set of excitation coefficients can be achieved, for example, by slightly changing the phase and by changing the order of the excitation coefficients.

Creating Well-Defined Interrogation Zones and Preventing Reader Collisions

Figure 38:
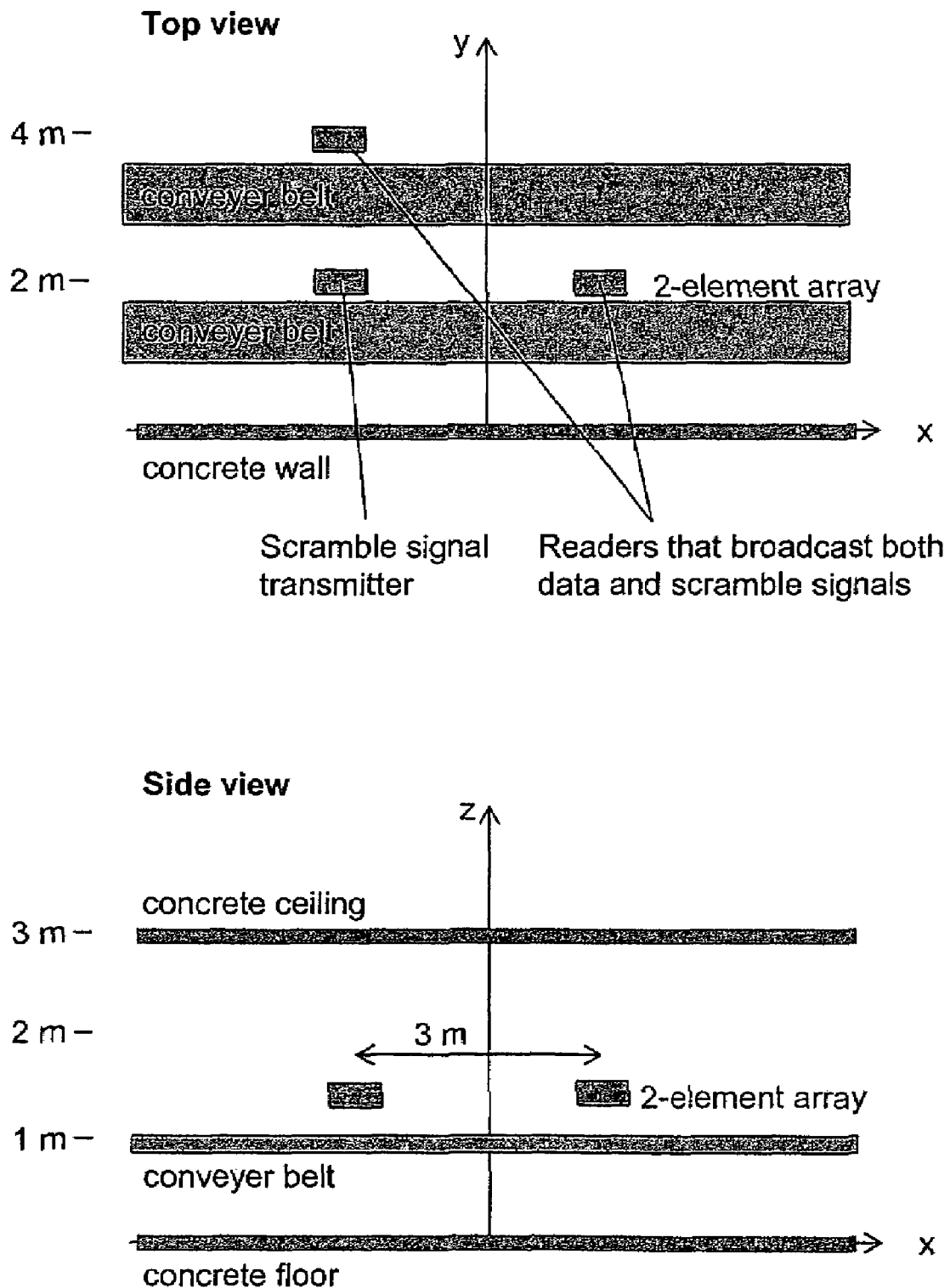
FIG. 38 illustrates top and side views of a 3D model of a network consisting of two RF tag readers and one scramble transmitter that each uses a 2-element antenna array. The readers operate in front of a concrete wall in a room with concrete floor and ceiling.

This section considers a network of readers and shows how to prevent interference and collisions between readers, as described in [6]. FIG. 38 shows two readers that are located in a room with a concrete wall, floor, and ceiling. The readers interrogate tags placed on items that move on two conveyer belts. Each reader uses the two-element array of patch antennas illustrated in FIGS. 24 and 25. The readers are in close proximity of each other and the concrete wall. Concrete is modeled by a homogeneous medium with a relative permittivity of 6 and a conductivity of 0.1 S/m. The field distributions are computed from geometrical optics with one bounce off each surface included. Polarization, reflection coefficients, and geometrical spreading are included in these calculations (this simulation and the other simulations are included simply for purposes of illustration; a different calculation of the field can be used in any given configuration to determine the fields to whatever order is needed). The power levels are adjusted so that when a reader operates in free space the data signal is just strong enough to set off tags 10 m away from the reader in the main-beam direction, as shown in FIG. 27.

Figure 39:
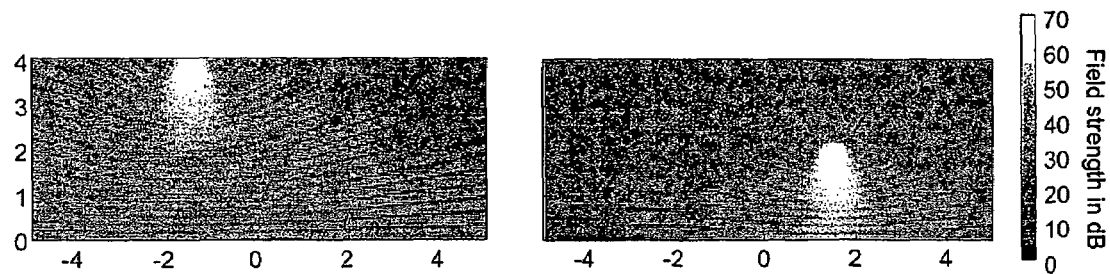
FIG. 39 illustrates signal strengths of the data beams of the two readers in FIG. 38. Reflections in the wall, floor, and ceiling are included. Axis units are in meters.
Figure 40:
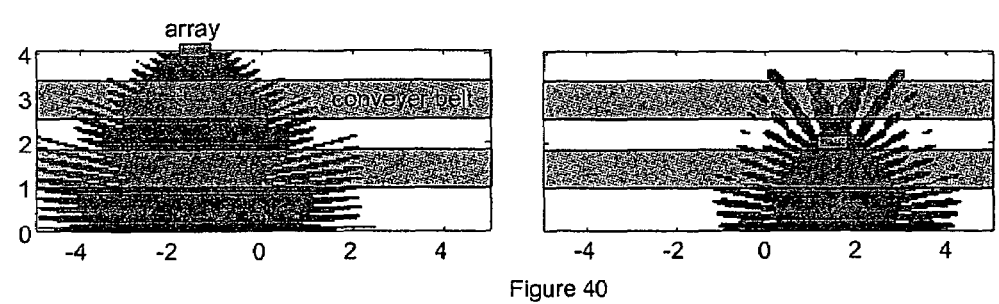
FIG. 40 illustrates interrogation zones of the data beams of the two readers in FIG. 38 when they broadcast toward the concrete wall. Reader collision occurs near the origin. Both readers set off tags on both conveyer belts so it is not possible to determine which conveyer belt carried a given item.

FIG. 39 shows the total field distributions 1.5 m above the concrete floor of the data signals of the left and right reader. The direct and reflected fields being in and out of phase cause the ripples of the total field. FIG. 40 shows the interrogation zones of the two readers when they broadcast only data signals. A tag placed near the origin will receive enough power from both readers to be powered up. However, such a tag would not function properly, even if the two readers broadcast at different frequencies, because it simultaneously receives two sets of instructions (reader collision occurs). Hence, the readers cannot operate simultaneously. Moreover, both readers interrogate tags on both conveyer belts, so it would not be possible to determine which belt carried a tagged item.

Figure 41:
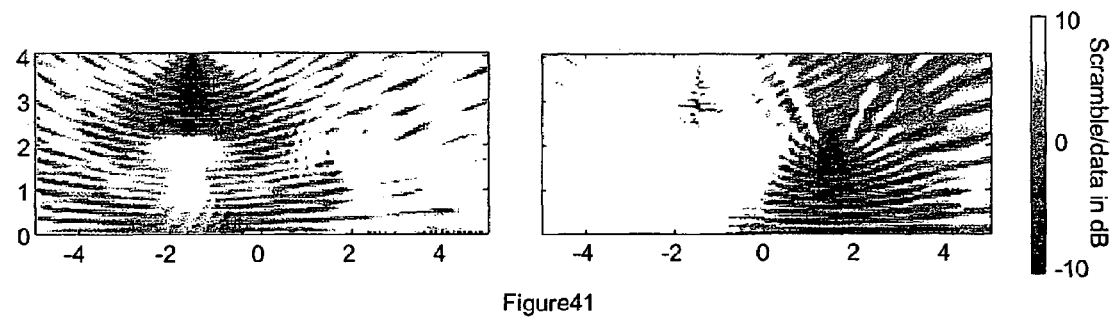
FIG. 41 (Left) illustrates the ratio of total scramble beam (obtained with the scramble transmitter and the two readers) to data beam of the reader on the left.
Figure 42:
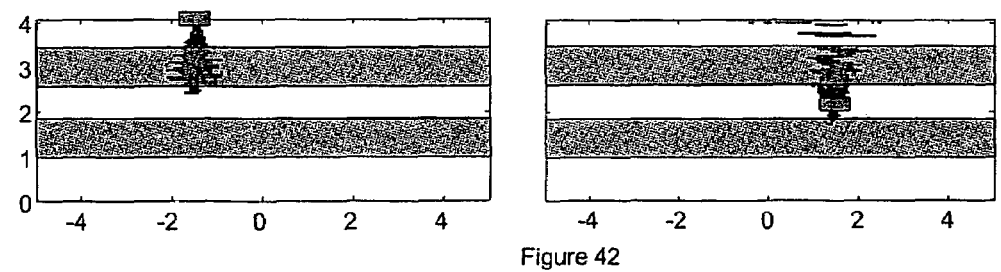
FIG. 42 illustrates two independent interrogation zones obtained with the combined data and scramble beams of the scramble transmitter and the two readers. Reader collision is avoided, and it is possible to tell which conveyer belt carries a given item.

For this example, assume that the two readers broadcast both data and scramble signals, and in addition place a scramble signal transmitter between the two conveyer belts as indicated in FIG. 38. FIG. 41 (Left) shows the ratio of total scramble beam (obtained with the scramble transmitter and the two readers) to data beam of the reader on the left. FIG. 41 (Right) shows the ratio of total scramble beam to data beam of the reader on the right. Tags are interrogated only in the regions where a data beam dominates. The data signals dominate in the dark shaded regions. FIG. 42 shows the interrogation zones of the two readers where (1) the power of the data signal is sufficient to set off a tag and (2) the data signal overshadows the scramble signal by at least 10 dB (where the value 10 dB is chosen for illustration purposes). The interrogation zones are now disjoint and each reader interrogates only the tags on one conveyer belt. This aspect of the present invention solves two problems: (1) Reader collision is avoided: tags near the origin stay quiet and do not modify their stored data because they receive a scramble signal that does not instruct them to operate. (2) It is now possible to determine which belt carried a tagged item.

More generally, one can set up a reader network with unknown parameters (array excitation coefficients, reader locations, and reader orientations) and optimize the parameters to create desired interrogation zones in a given environment. The optimization can be carried out by interactive methods that minimize a user-defined cost function (see, for example, P. Venkataraman, "Applied Optimization with MATLAB Programming," Wiley, 2001). This approach is equivalent to an inverse source problem where the task is to determine the strength and location of sources that result in a desired field distribution.

One type of solution would determine the optimal source distribution (excitation coefficients) to maximize the signal from a tag placed on a particular object using the techniques described in the paper by David Isaacson entitled "Distinguishability of Conductivities by Electric Current Computed Tomography" (IEEE Trans. on Medical Imaging, Vol. MI-5, No. 2, 91-95, 1986).

In one embodiment of this method, the array element locations are fixed and on-site measurements are carried out to determine the N one-element field distributions described above. These N data sets are subsequently used in an optimization procedure that determines array coefficients that produce the desired interrogation regions.

Optimum Tag Placement

Numerous studies have demonstrated the difficulty of reading tags accurately, especially when other objects shield the tags from the interrogation signal (see, for example, "RFID will present a stiff test," Supply Chain Management Review, Jan. 15, 2004). This section describes a systematic method for determining the optimal tag placement that will maximize the scattered field from the tags. The method involves the following steps:

(1) Create a model of the environment in which the tags must operate. For example, if the tags are to be placed on individual soda bottles that are stacked on a pallet, the model would consist of a collection of stacked high-dielectric scatterers shaped as soda bottles.

(2) Numerically determine the total electric field for the scattering problem in which the field of the reader illuminates the model. For the soda bottles on the pallet, a finite-difference time-domain method would be suitable for determining the total electric field everywhere (A. Taflove and S. Hagness, "Computational Electrodynamics: The Finite-Difference Time-Domain Method," Artech House, $2^{nd}$ Ed., 2000). High-frequency methods (A. K. Bhattacharyya, "High-Frequency Electromagnetic Techniques," John Wiley & Sons, 1995) and exact solutions (W. C. Chew, "Waves and Fields in Inhomogeneous Media," IEEE Press, 1995) are also useful for solving the scattering problems.

(3) Based on the computed field distribution, place the tag antennas such that the electric field is disturbed as much as possible. For example, if the tag antenna is a linear dipole and the object is a soda bottle, the dipole should be placed at a point on the surface of the bottle where the electric field is strongest. Moreover, the tag antenna should be aligned with the electric field at that point. For soda bottles on a pallet, the optimum tag locations may vary from bottle to bottle.

Figure 43:
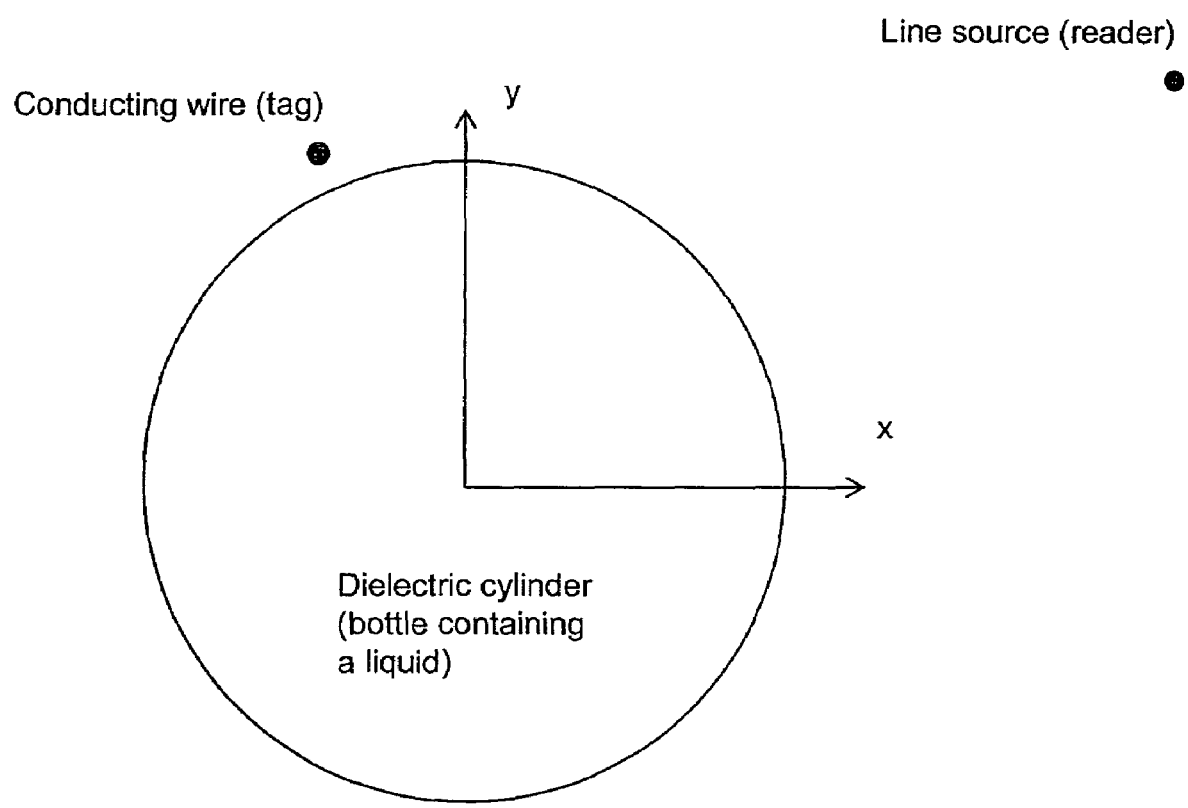
FIG. 43 illustrates a 2D model of a reader that interrogates a tag placed on a high-dielectric object. The field of a line source (the reader) illuminates a dielectric cylinder (bottle containing a liquid). A conducting wire (the tag) is close to the surface of the cylinder.
Figure 44:
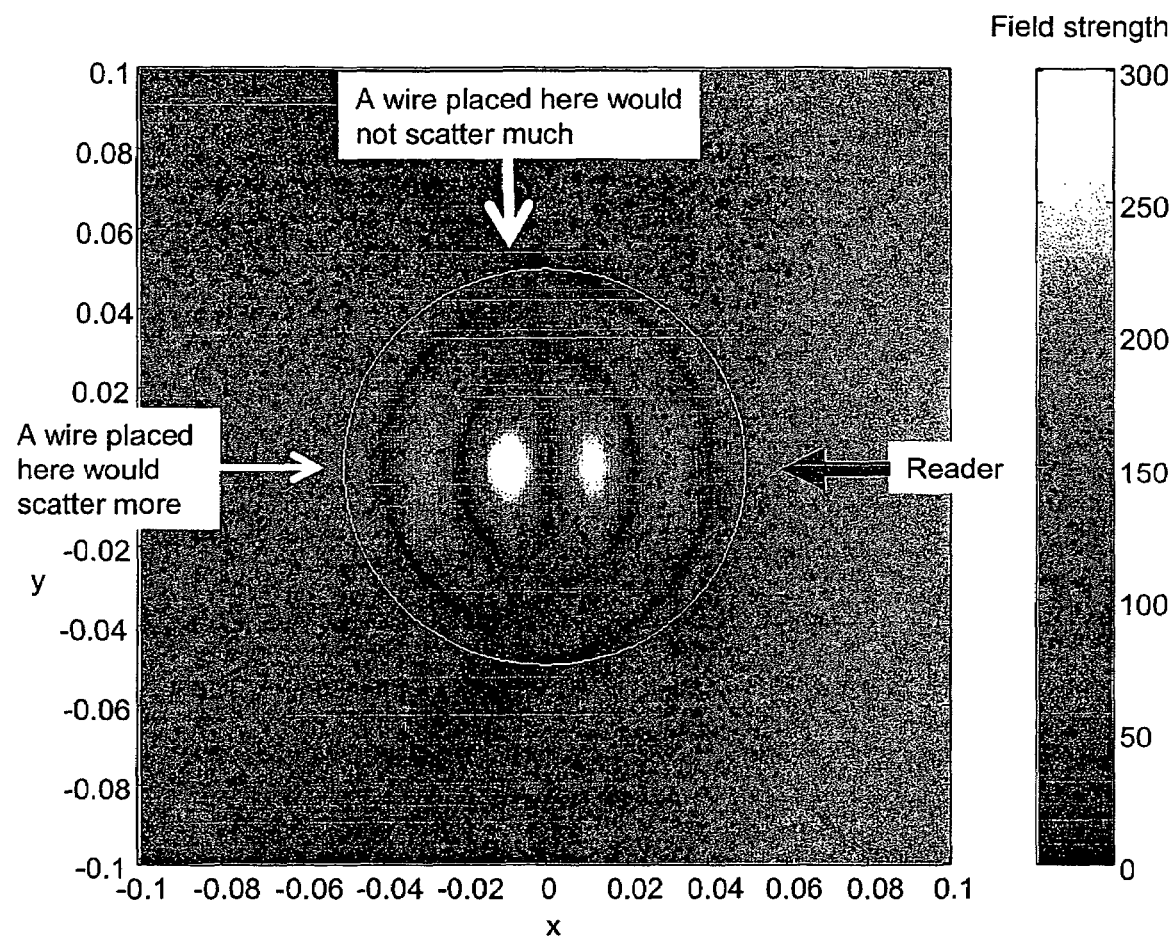
FIG. 44 illustrates the total field in the vicinity of the dielectric cylinder when the wire is removed. The white circle marks the surface of the cylinder.
Figure 45:
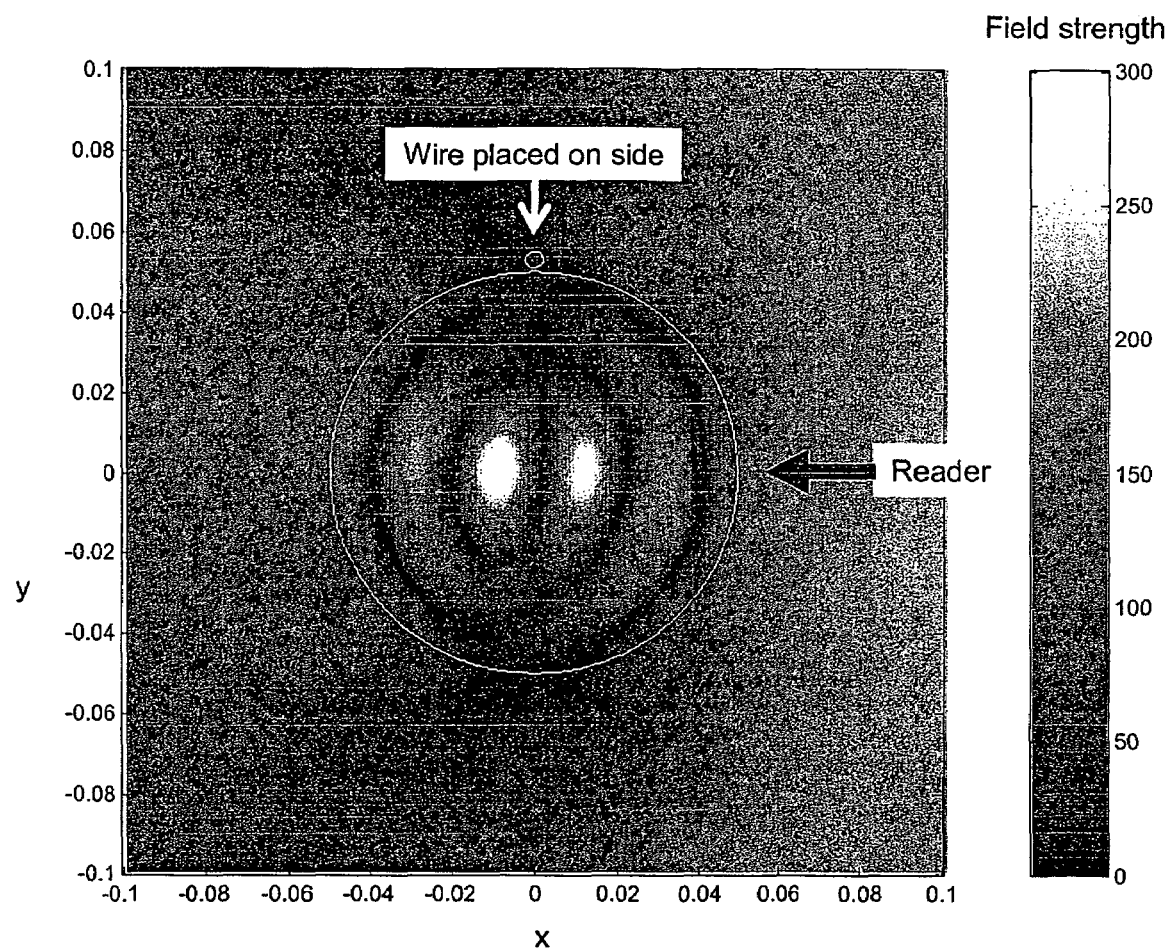
FIG. 45 illustrates the total field in the vicinity of the dielectric cylinder when the wire is placed on the side of the cylinder (as seen from the reader).
Figure 46:
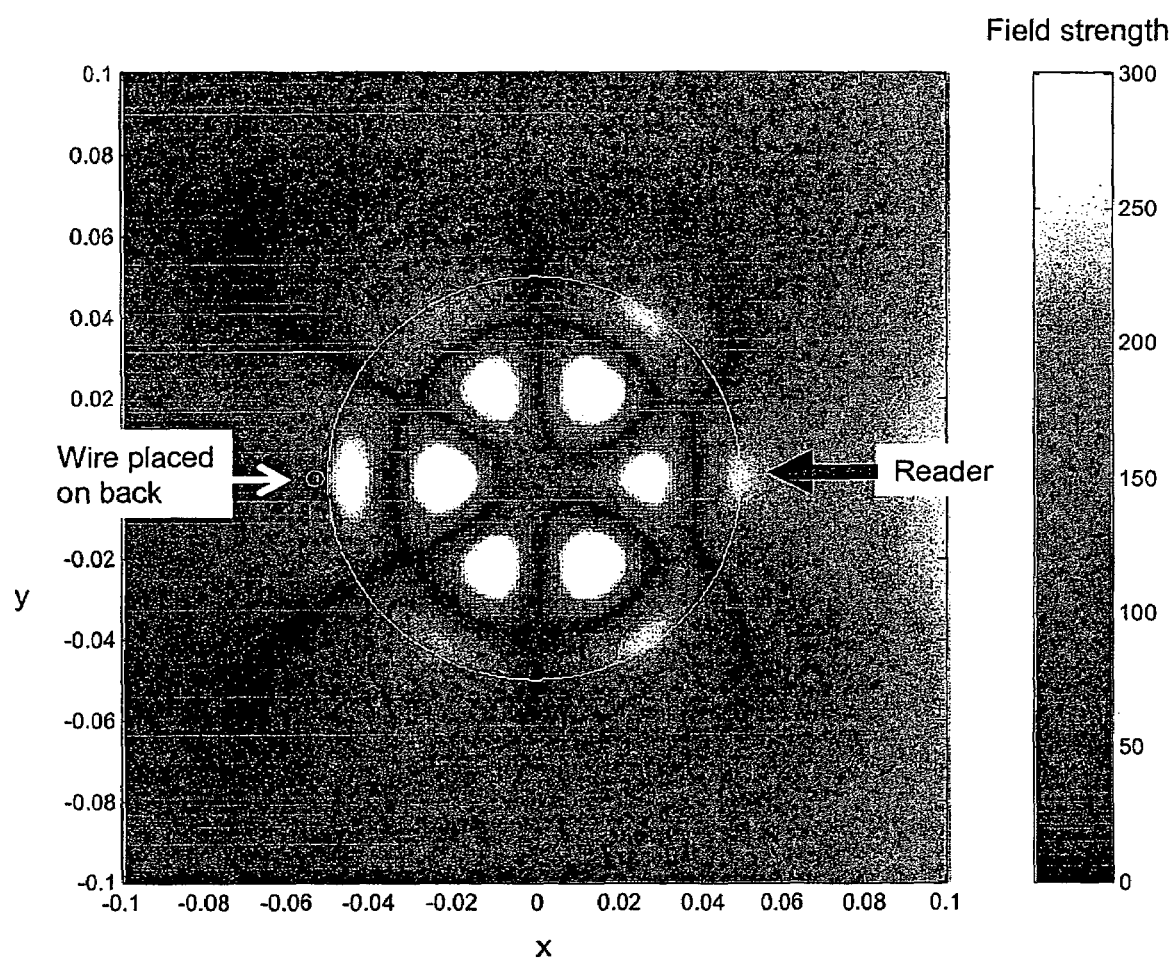
FIG. 46 illustrates the total field in the vicinity of the dielectric cylinder when the wire is placed on the back of the cylinder (as seen from the reader).

As shown by the 2D model in FIG. 43, this method works in the following way: the item to be tagged is modeled by an infinite dielectric cylinder of radius 5 cm with a relative dielectric constant of 81 and a conductivity of 0.01 S/m. The field of a line source (the reader) illuminates a dielectric cylinder (bottle containing a liquid). A conducting wire (the tag) is close to the surface of the cylinder. The reader is modeled with an electric line source 5 m away that broadcasts at 900 MHz. Assume that the reader is monostatic: the transmitting and receiving antennas are collocated. FIG. 44 shows the resulting total electric field inside and outside the dielectric cylinder, whose circumference is indicated by a distinct circle. An optimal tag placement for this object would be either the front or back (as seen from the reader) where the electric field attains its maximum values. A tag placed on the sides of the dielectric cylinder would not scatter much. The field distributions obtained with a thin wire placed on the side and on the back of the dielectric object are shown in FIGS. 45 and 46, respectively. As expected, the wire placed on the back (FIG. 46) alters the field much more than the wire placed on the side (FIG. 45).

To compute the modulated scattered field that would be observed by the reader, one may model the two states of a tag as follows: A short-circuited tag antenna is a thin wire, and an open-circuited tag antenna is an absent wire. With this model, a tag placed on the side of the dielectric object communicates with the reader by changing the field distribution from the one displayed in FIG. 44 (tag antenna open-circuited) to the distribution in FIG. 45 (tag antenna short-circuited). Similarly, a tag placed on the back of the dielectric object communicates with the reader by changing the field distribution from the one displayed in FIG. 44 (tag antenna open-circuited) to the distribution in FIG. 46 (tag antenna short-circuited).

Figure 47:
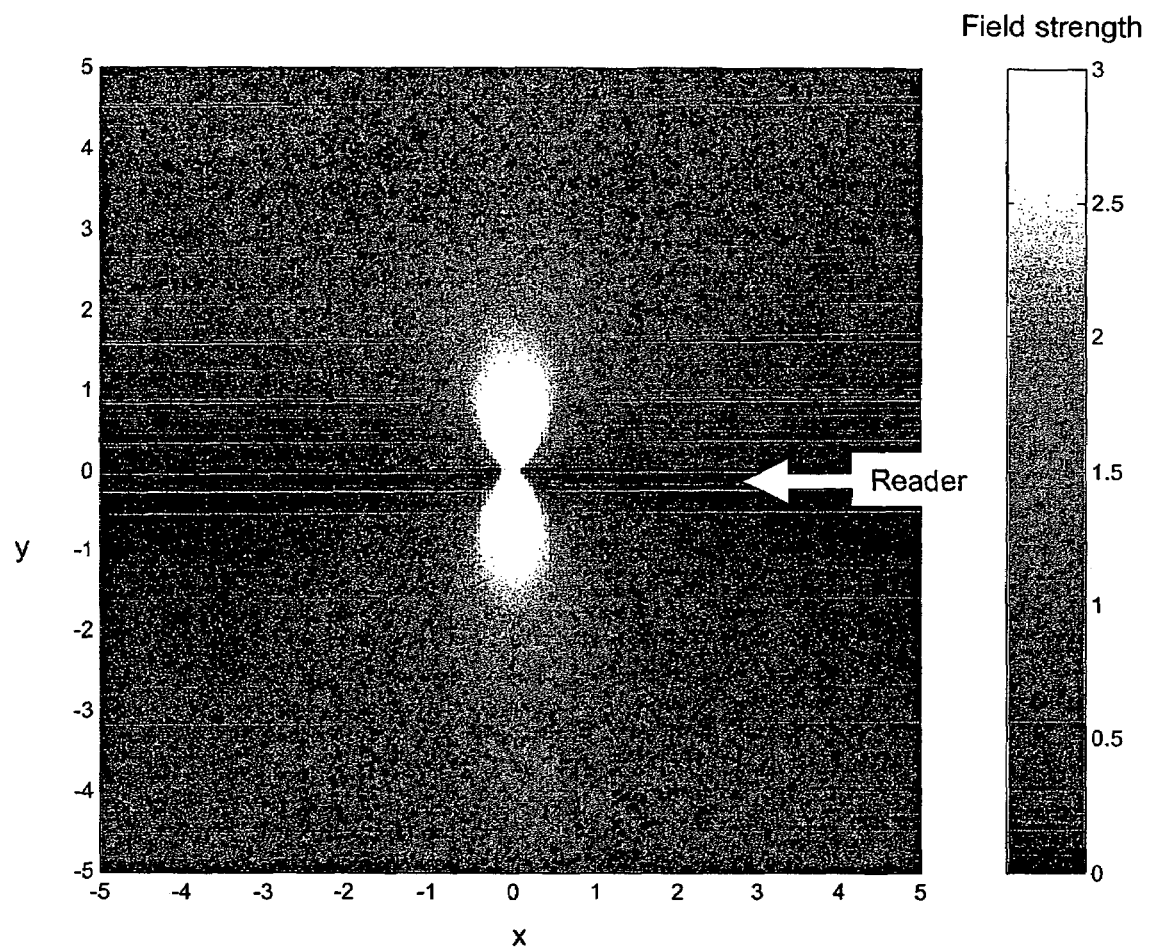
FIG. 47 illustrates the difference far field for tag placed on the side of the cylinder. The amplitude of the backscattered field is very low.
Figure 48:
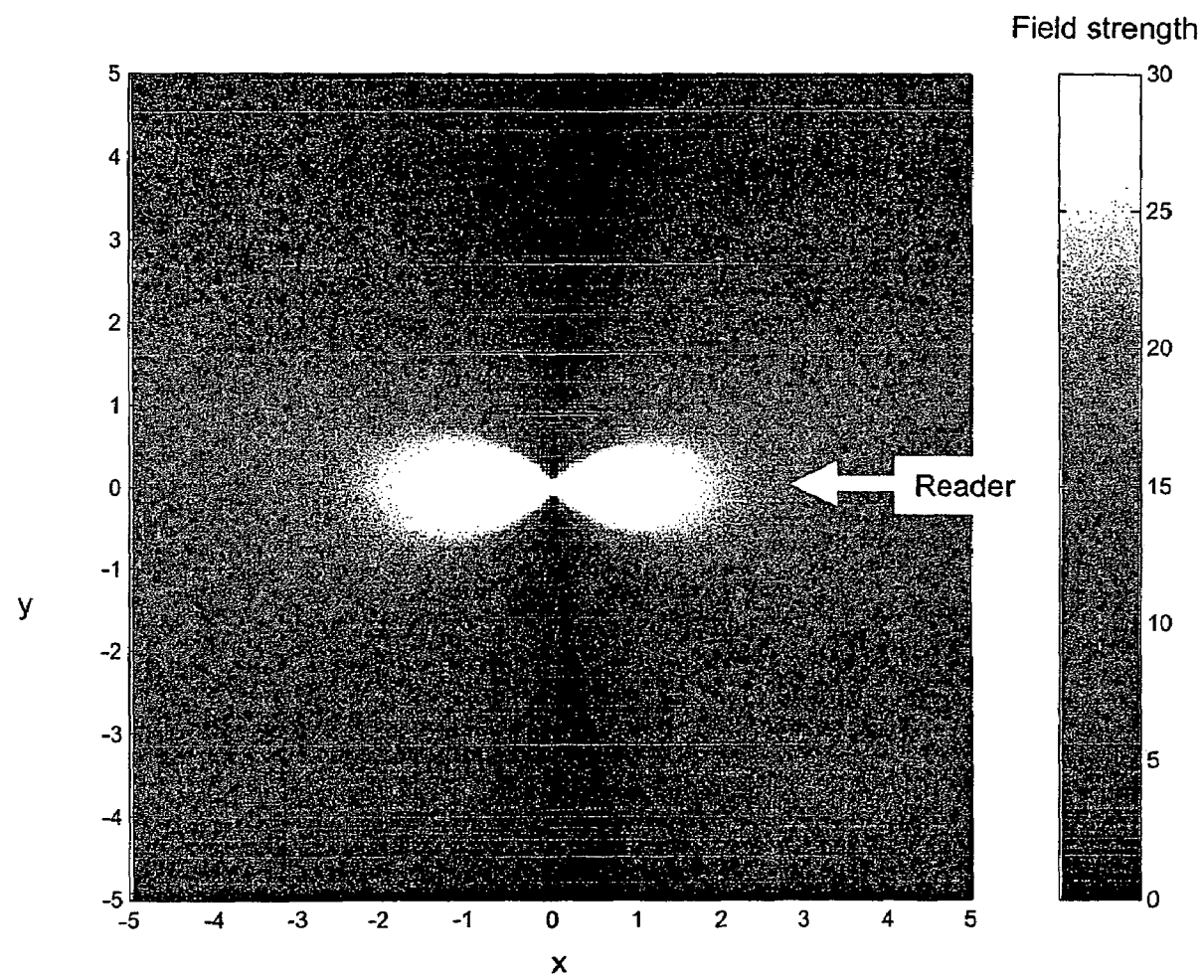
FIG. 48 illustrates the difference far field for tag placed on the back of the cylinder. The amplitude of the backscattered field is large.

The difference fields recorded by the reader far from the dielectric cylinder are shown in FIG. 47 (tag placed on side of cylinder) and FIG. 48 (tag placed on back of cylinder). As expected from the discussion above, the difference field is very weak when the tag is placed on the side of the cylinder, so the tag may not be read correctly. By placing the tag on the back of the cylinder in accordance with the method of the present invention, a much stronger difference field results (at least 100 times stronger) and the chances that the reader accurately obtains the information stored on the tag greatly improves.

Bistatic RFID Reader Configuration

Figure 49:
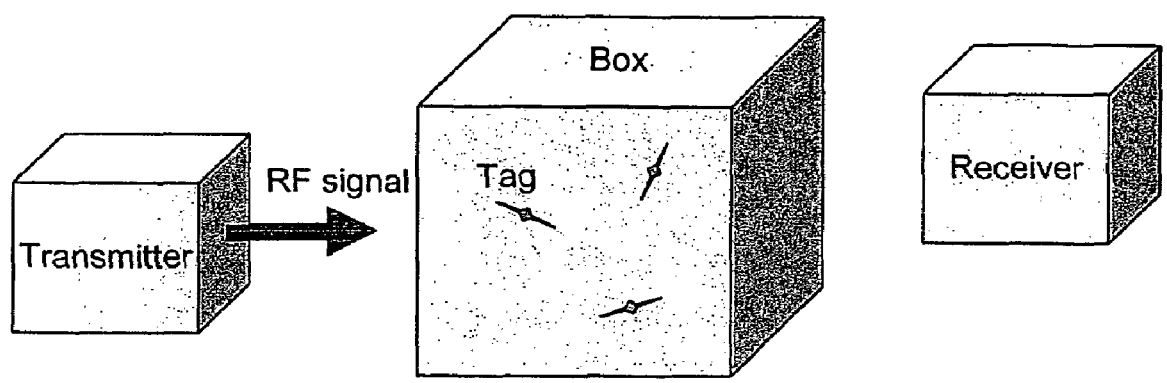
FIG. 49 illustrates a Bistatic RFID reader with a transmitter and a receiver that interrogates a collection of tags that are placed on items in a box.

A bistatic reader configuration is shown in FIG. 49 where the transmitter and receiver are not collocated. FIG. 49 shows a bistatic RFID reader consisting of a transmitter and a receiver that interrogates a collection of tags that are placed on items in a box. The difference field in FIG. 47 attains its maximum values at locations that are approximately 90° away from the transmitting antenna of the reader. Hence, if the receiving antenna of the reader were placed 90° away from the transmitting antenna, the reader would more effectively interrogate the tag in this configuration where the tag is on the side of the cylinder. Moreover, by separating the transmitter from the receiver, the direct coupling is significantly reduced and the read range is no longer limited by the condition that the tag signal may be no more than 100 dB below the level of the transmitters carrier signal. (See page 145 of reference [1] cited above for a discussion of the 100 dB condition.)

This example illustrates two advantages of a bistatic reader over a monostatic reader: (1) a bistatic reader may be able to correctly read certain tags that cannot be read accurately by a monostatic reader because the back scattered field is much weaker than the scattered field at an optimal receiver location, and (2) the direct coupling between the transmitter and receiver is much weaker for a bistatic reader, thus making it possible to correctly interrogate tags that are further away.

An even more effective reader would have several receiving antennas distributed around the objects of interrogation to pick up scattered fields that peak in many different directions (multistatic reader). For fixed geometries, such as soda bottles on a pallet, numerical simulations can determine the optimal bistatic configuration. The use of numerical simulations to optimize the placement of tags and reader antennas is illustrated by the example above, which shows that a 90° bistatic configuration is optimal for a tag placed on the side of a dielectric cylinder.

Although the present invention and its advantages have been described in detail, it should be understood that various changes, substitutions, and alterations can be made herein without departing from the invention as defined by the appended claims. Moreover, the scope of the present application is not intended to be limited to the particular embodiments of the process, machine, manufacture, composition of matter, means, methods, and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for interrogating RFID tags comprising:
    transmitting a data signal that causes said RFID tags to respond,
    transmitting one or more scramble signals that do not cause said RFID tags to respond, wherein at least one of said one or more scramble signals charges said RFID tags when said RFID tags are not being interrogated, and
    adjusting said data signal and said one or more scramble signals such that said one or more scramble signals overshadow said data signal in all but selected regions.
2. The method of claim 1, wherein at least one of said one or more scramble signals contains a separate intelligible data stream.
3. The method of claim 1, wherein at least one of said one or more scramble signals broadcasts a sine wave.
4. The method of claim 1, wherein said selected regions are varied during the transmission of said data signal.
5. The method of claim 1, wherein said data signal comprises a plurality of bits, and said plurality of bits is divided into a first part and a second part.
6. The method of claim 5, wherein for each of said first part and said second part, a corresponding scramble-signal null direction is defined that is slightly away from the peak direction of said data signal.
7. The method of claim 5, wherein each of said first part and said second part is transmitted while at least one of said one or more scramble signals has its central null steered in the direction of a corresponding scramble-signal null direction.
8. A method for interrogating RFID tags comprising:
    transmitting a data signal that causes said RFID tags to respond,
    transmitting one or more scramble signals that do not cause said RFID tags to respond, wherein said one or more scramble signals have approximately constant amplitudes away from a central null for each scramble signal, and the total radiated power is approximately omni-directional, and
    adjusting said data signal and said one or more scramble signals such that said one or more scramble signals overshadow said data signal in all but selected regions.
9. The method of claim 8, wherein constant-amplitude scramble signals are achieved by moving zeros off a Schelkunoff unit circle.
10. The method of claim 8, wherein constant-amplitude scramble signals are achieved by iterative methods.
11. A method for interrogating RFID tags comprising:
    transmitting a data signal that causes said RFID tags to respond,
    transmitting one or more scramble signals that do not cause said RFID tags to respond,
    adjusting said data signal and said one or more scramble signals such that said one or more scramble signals overshadow said data signal in all but selected regions,
    employing two or more array readers that scan an area with data and scramble signals to determine the angular positions of each tag within range, and
    determining the absolute position of said RFID tags through triangulation using the angular positions obtained with said two or more array readers.
12. The method of claim 11, further comprising the step of:
    employing anti-collision methods when more than one of said RFID tags responds at any given scan angle.
13. The method of claim 1, wherein said reader and said RFID tags are inductively coupled and said reader employs two or more loops to transmit said data signal and said one or more scramble signals.
14. The method of claim 13, wherein the configuration of said loops of said reader is optimized with iterative techniques to ensure that the magnetic field of said data signal is overshadowed by the magnetic fields of said one or more scramble signal except in selected regions.
15. The method of claim 1, further comprising the step of employing one or more security measures.
16. The method of claim 15, wherein said one or more security measures comprises placing of nulls in receiving patterns.
17. The method of claim 15, wherein said one or more security measures comprises using highly directive antennas.
18. The method of claim 15, wherein said one or more security measures comprises transmitting scramble signals.

* * * * *